United States Patent
Oikawa

(10) Patent No.: US 8,477,233 B2
(45) Date of Patent: Jul. 2, 2013

(54) IMAGE CAPTURING APPARATUS

(75) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 13/063,801

(22) PCT Filed: Oct. 14, 2009

(86) PCT No.: PCT/JP2009/068215
§ 371 (c)(1),
(2), (4) Date: Mar. 14, 2011

(87) PCT Pub. No.: WO2010/050403
PCT Pub. Date: May 6, 2010

(65) Prior Publication Data
US 2011/0164166 A1    Jul. 7, 2011

(30) Foreign Application Priority Data

Oct. 30, 2008   (JP) .................... 2008-280274

(51) Int. Cl.
*G03B 13/00*   (2006.01)
*H04N 5/232*   (2006.01)

(52) U.S. Cl.
USPC .......................................... 348/350; 348/345

(58) Field of Classification Search
USPC ....................................................... 348/350
See application file for complete search history.

(56) References Cited

U.S. PATENT DOCUMENTS

| | | | |
|---|---|---|---|
| 5,373,342 A | 12/1994 | Utagawa | |
| 7,474,352 B2 * | 1/2009 | Oikawa | 348/349 |
| 2001/0036361 A1 | 11/2001 | Suda | |
| 2006/0045507 A1 * | 3/2006 | Takamiya | 396/111 |
| 2007/0206940 A1 | 9/2007 | Kusaka | |

FOREIGN PATENT DOCUMENTS

| | | |
|---|---|---|
| EP | 1936955 A2 | 6/2008 |
| EP | 1986045 A2 | 10/2008 |
| JP | 52-138924 A | 11/1977 |
| JP | 60-014211 A | 1/1985 |
| JP | 63-172110 A | 7/1988 |
| JP | 03-214133 A | 9/1991 |

(Continued)

OTHER PUBLICATIONS

Office Action dated Sep. 26, 2012, in Korean Patent Application No. 10-2011-7011969.

(Continued)

*Primary Examiner* — Anthony J Daniels
(74) *Attorney, Agent, or Firm* — Fitzpatrick, Cella, Harper & Scinto

(57) ABSTRACT

An image capturing apparatus comprises a photoelectric conversion unit including a first pixel group which photoelectrically converts an object image formed via a first exit pupil region of a photographing lens and a second pixel group which photoelectrically converts an object image formed via a second exit pupil region; a focus detection unit which detects a focus of the photographing lens using a first image signal obtained from the first pixel group and a second image signal obtained from the second pixel group; a calculation unit which calculates an inclination of a straight line connecting a barycenter of the first exit pupil region and a barycenter of the second exit pupil region from a pixel arrangement direction of the first pixel group and second pixel group; and a focus detection range setting unit which sets a focus detection range based on a calculation result of the calculation unit.

12 Claims, 30 Drawing Sheets

FOREIGN PATENT DOCUMENTS

| | | |
|---|---|---|
| JP | 05-127074 A | 5/1993 |
| JP | 08-054560 A | 2/1996 |
| JP | 2000-156823 A | 6/2000 |
| JP | 2003-029135 A | 1/2003 |
| JP | 2003-250080 A | 9/2003 |
| JP | 2004-191629 A | 7/2004 |
| JP | 2005-062459 A | 3/2005 |
| JP | 2007-121896 A | 5/2007 |
| JP | 2007-189312 A | 7/2007 |
| JP | 2008-040084 A | 2/2008 |
| JP | 2008-083456 A | 4/2008 |
| JP | 2008-152012 A | 7/2008 |
| WO | 2008/032820 A | 3/2008 |

OTHER PUBLICATIONS

Communication and Supplemental Search Report dated Nov. 26, 2012, in European Patent Application No. 09823498.2.
Search Report, dated Jan. 31, 2013, in European Application No. 09823514.6.

* cited by examiner

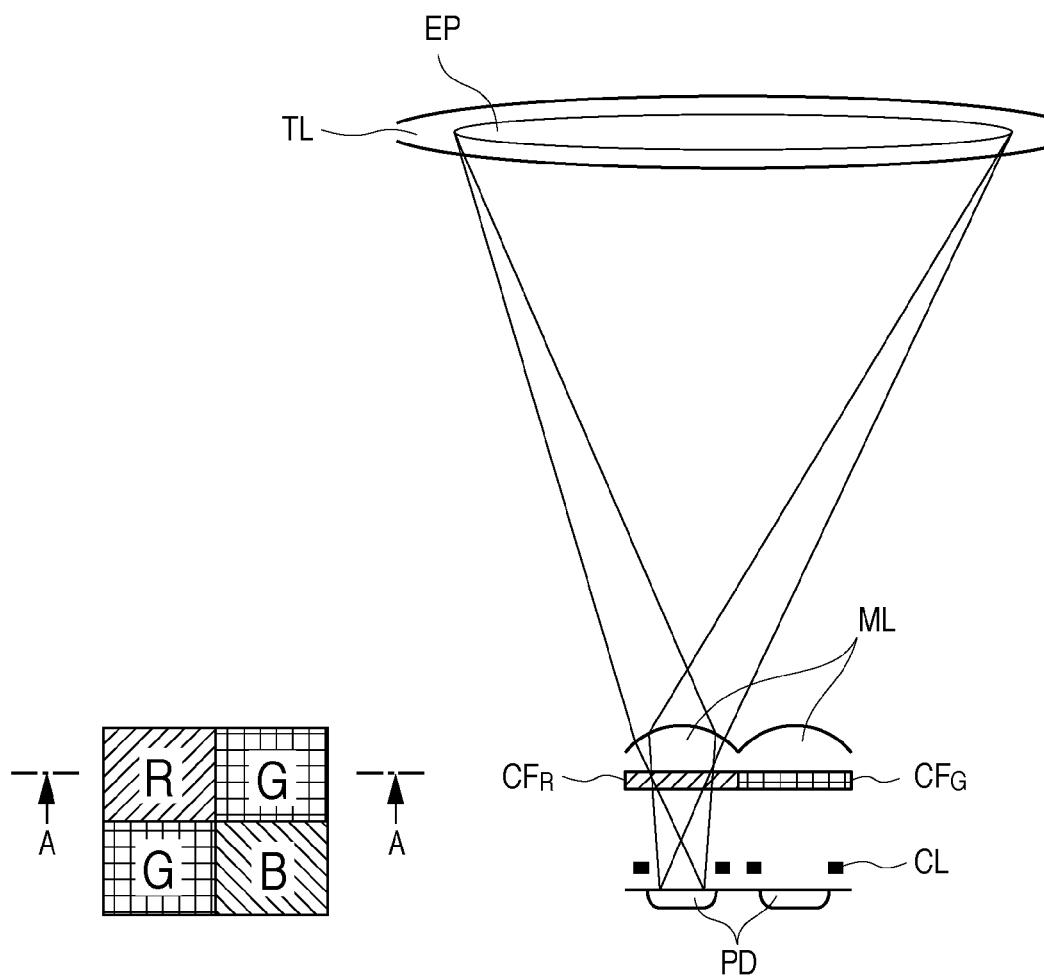
F I G. 5A    F I G. 5B

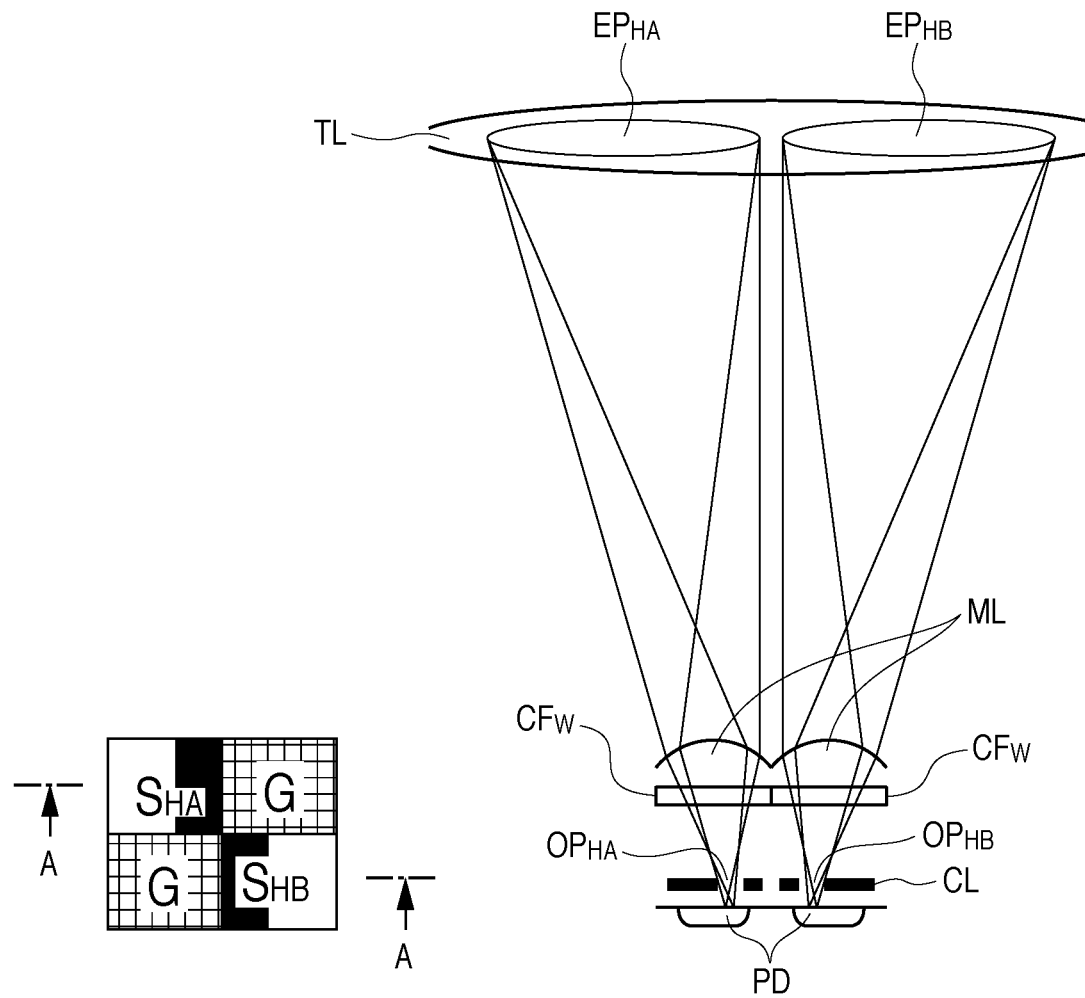
F I G. 6A    F I G. 6B

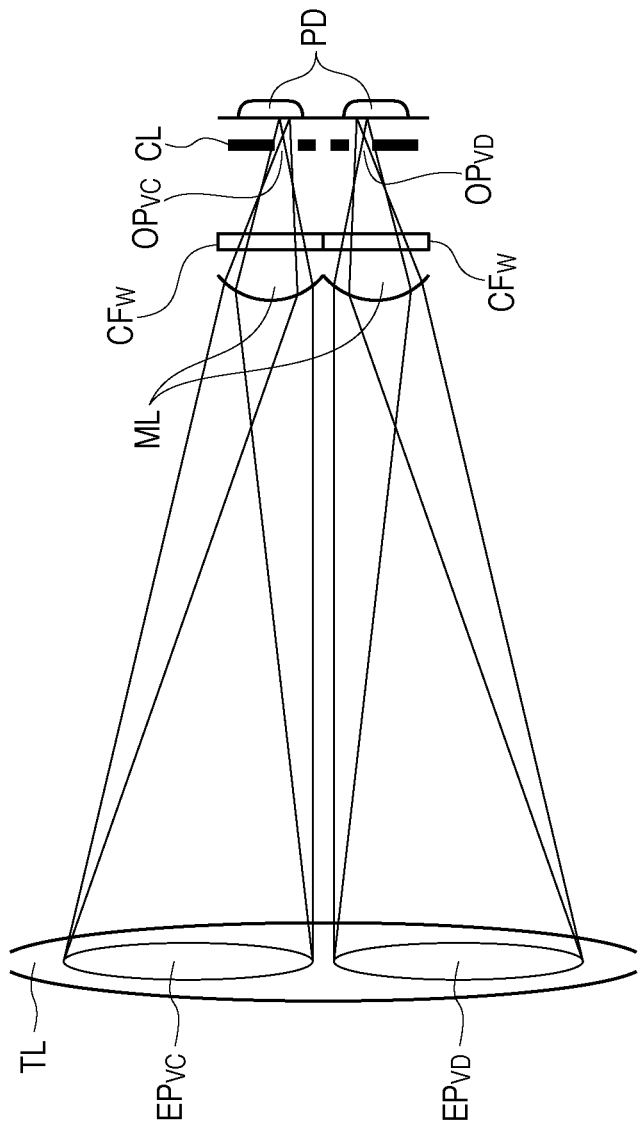
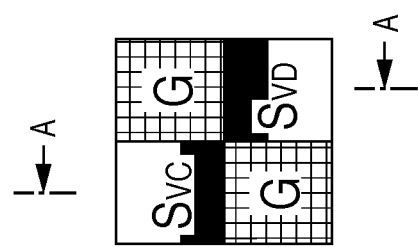
FIG. 7B
FIG. 7A

F I G. 30
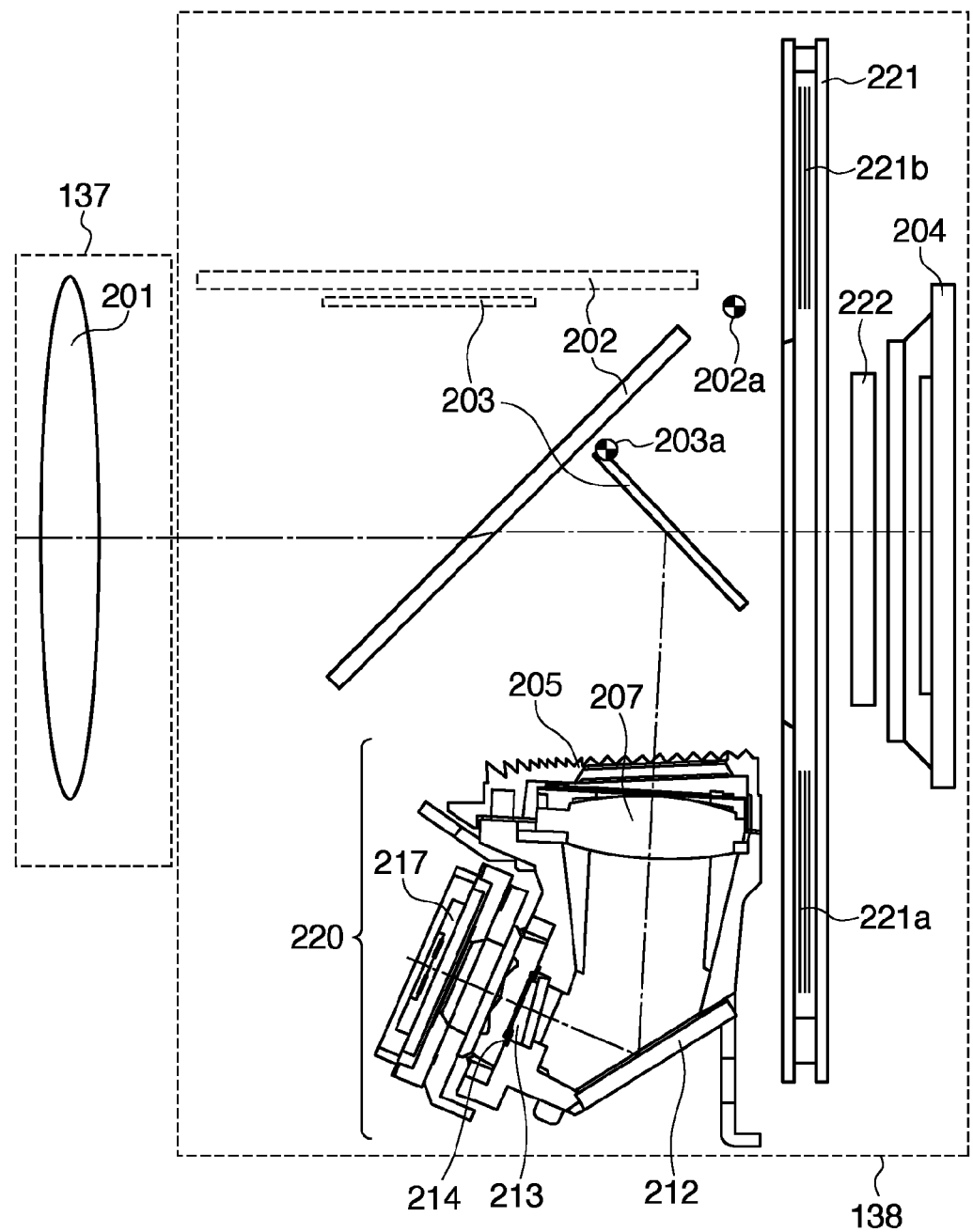

F I G. 34
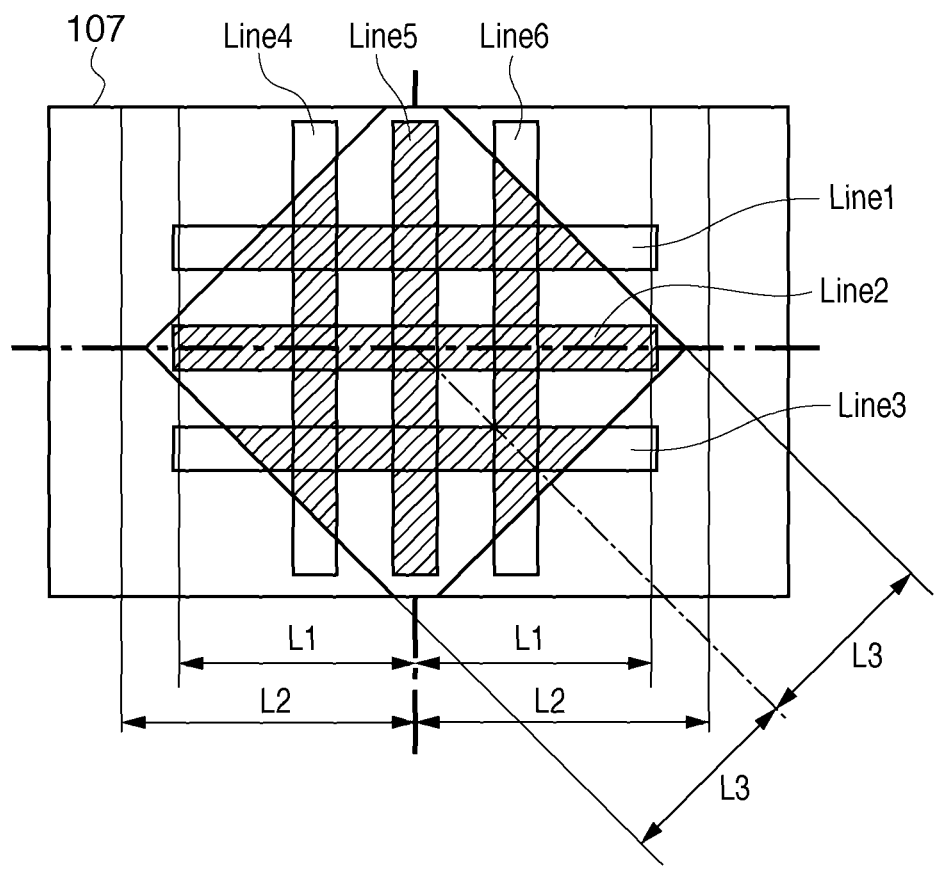

IMAGE CAPTURING APPARATUS

TECHNICAL FIELD

The present invention relates to an image capturing apparatus including a focus detection unit which detects the focus state of a photographing lens from the relative positions of a pair of image signals obtained from a photoelectric conversion element.

BACKGROUND ART

There has conventionally been known a focus detection method of detecting the focus state of a photographing lens from the phase difference between a pair of image signals whose relative positions change depending on the focus state of the photographing lens. This method is disclosed in, for example, Japanese Patent Laid-Open No. 5-127074. According to this method, a so-called pupil-dividing focus detection optical system forms a pair of object images on a photoelectric conversion element from a pair of light beams having passed through a photographing optical system. The photoelectric conversion element photoelectrically converts the object images into object image signals. The object image signals undergo predetermined calculation, calculating the defocus amount of the photographing optical system.

In the pupil-dividing focus detection optical system, the photoelectric conversion element includes the first focus detection pixel array having the first incident angle distribution and the second focus detection pixel array having the second incident angle distribution shifted from the first one. The direction in which the incident angle distribution shifts is called a pupil-dividing direction. By pupil division, a pair of focus detection pixel arrays receive light beams having passed through a pair of different photographing lens pupil regions shifted in the pupil-dividing direction. As the focus state of the photographing lens changes, a pair of optical images formed via a pair of pupil regions move in opposite directions along the pupil-dividing direction. By forming the first and second focus detection pixel arrays in the pupil-dividing direction, the moving amounts of a pair of optical images are detected to estimate the focus state. This is the principle of the pupil-dividing focus detection.

The pupil-dividing focus detection device sometimes suffers an eclipse of a light beam used for focus detection depending on a combination of the photographing optical system and focus detection optical system. A nonuniform eclipse adversely affects the focus detection precision, and in the worst case, focus detection fails.

Japanese Patent Laid-Open No. 3-214133 discloses a technique of reducing the adverse effect by the eclipse. According to Japanese Patent Laid-Open No. 3-214133, light quantity distribution information which associates a decrease in light quantity by the photographing optical system and focus detection optical system with a position on the surface of a light receiving element is calculated. Based on the light quantity distribution information, the focus detection range is defined or the signal is corrected.

Japanese Patent Laid-Open No. 3-214133 considers a decrease in light quantity, but does not consider the inclination of the barycenters of a pair of pupil regions of the focus detection optical system toward the pupil-dividing direction.

If a pair of pupil regions are extracted into a shape inclined in the pupil-dividing direction owing to the eclipse of the photographing lens, their barycenters incline in the pupil-dividing direction. The first and second focus detection pixel arrays are formed parallel to the pupil-dividing direction. For this reason, the direction in which a pair of object images formed via a pair of pupil regions move deviates from the direction of the first and second focus detection pixel arrays. If the image moving direction and detection pixel arrangement direction do not match each other, a parallax occurs between a pair of optical images detected by the first and second focus detection pixel arrays. The parallax changes the interval between detected images, generating a focus detection error.

DISCLOSURE OF INVENTION

The present invention has been made to solve the above-described drawbacks, and enables high-precision focus detection by suppressing a focus detection error generated by an eclipse of a photographing lens.

According to the present invention, there is provided an image capturing apparatus comprising: photoelectric conversion means including a first pixel group which photoelectrically converts an object image formed via a first exit pupil region of a photographing lens and a second pixel group which photoelectrically converts an object image formed via a second exit pupil region different from the first exit pupil region; focus detection means for detecting a focus of the photographing lens using a first image signal obtained from the first pixel group and a second image signal obtained from the second pixel group; calculation means for calculating an inclination of a straight line connecting a barycenter of the first exit pupil region and a barycenter of the second exit pupil region from a pixel arrangement direction of the first pixel group and second pixel group; and focus detection range setting means for setting a focus detection range based on a calculation result of the calculation means.

Further features of the present invention will become apparent from the following description of exemplary embodiments with reference to the attached drawings.

BRIEF DESCRIPTION OF DRAWINGS

FIGS. 5A and 5B are a plan view and sectional view of an image sensing pixel in the image sensor, respectively;

FIGS. 6A and 6B are a plan view and sectional view of a focus detection pixel in the image sensor, respectively;

FIGS. 7A and 7B are a plan view and sectional view of another focus detection pixel in the image sensor, respectively;

FIG. 30 is a side sectional view of an image capturing apparatus including a focus detection device according to the third embodiment;

FIG. 34 is a view showing the shape of a focus detection range according to the third embodiment.

BEST MODE FOR CARRYING OUT THE INVENTION

Embodiments of the present invention will now be described in detail with reference to the accompanying drawings.

First Embodiment

FIGS. 1 to 28 are views for explaining the first embodiment of the present invention. The first embodiment will be described with reference to the accompanying drawings.

Figure 1:
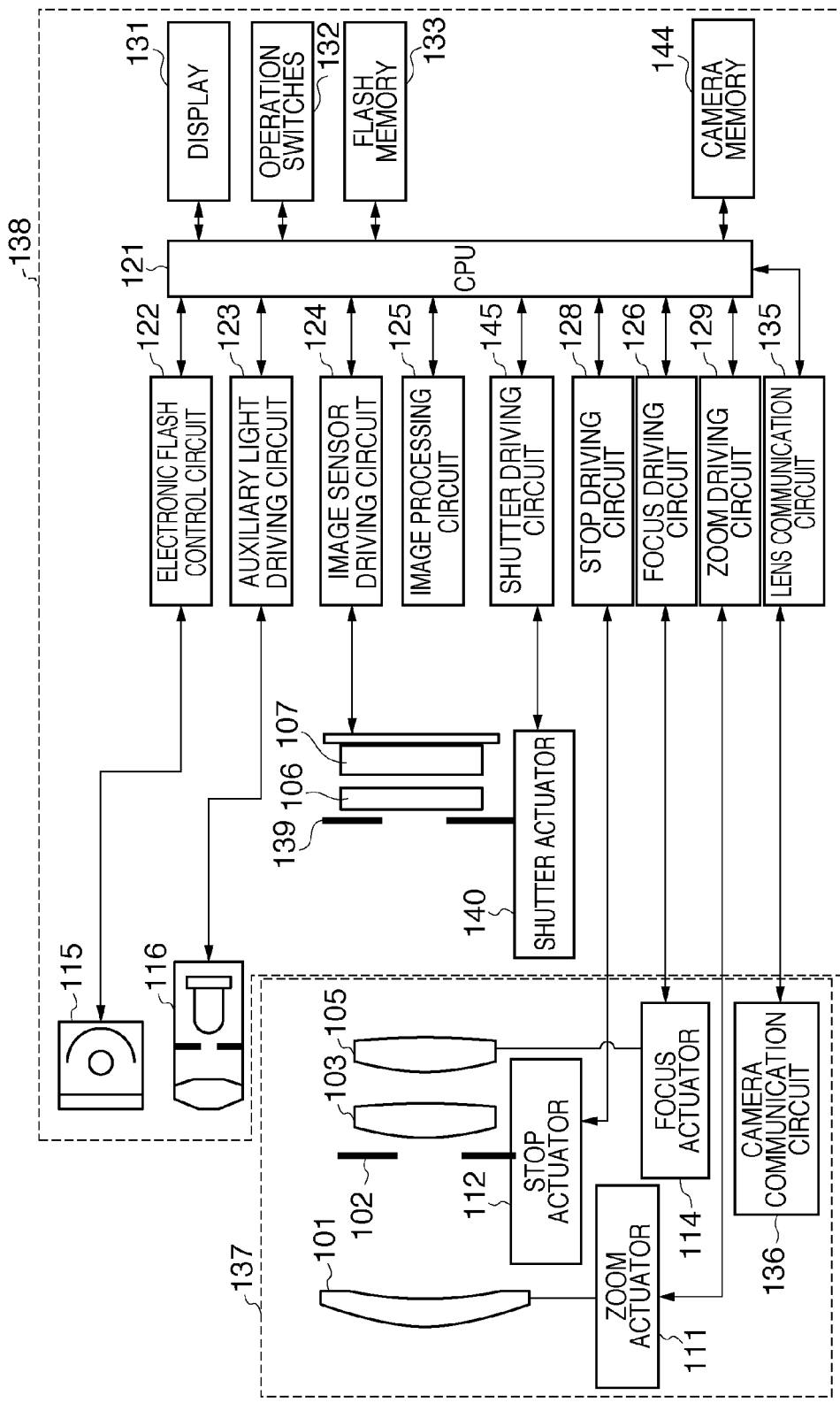
FIG. 1 is a block diagram showing the arrangement of a camera according to the first embodiment of the present invention.

FIG. 1 is a block diagram of the arrangement of an image capturing apparatus according to the first embodiment of the present invention. FIG. 1 shows a digital camera which includes a camera body 138 having an image sensor and a separate photographing lens 137 and interchangeably mounts the photographing lens 137 on the camera body 138.

First, the arrangement of the photographing lens 137 will be explained.

A first lens group 101 is arranged at the distal end portion of a photographing optical system (imaging optical system) and held reciprocally along the optical axis. A stop 102 adjusts the aperture diameter to adjust the light quantity in shooting. Reference numeral 103 denotes a second lens group. The stop 102 and second lens group 103 reciprocate together along the optical axis to achieve a zoom operation (zoom function) in synchronism with reciprocal movement of the first lens group 101.

A third lens group 105 reciprocates along the optical axis to adjust the focus. By pivoting a cam cylinder (not shown), a zoom actuator 111 drives the first lens group 101 and second lens group 103 to reciprocate along the optical axis and perform the zoom operation. A stop actuator 112 controls the aperture diameter of the stop 102 to adjust the light quantity in shooting. A focus actuator 114 drives the third lens group 105 to reciprocate along the optical axis and adjust the focus. A shutter 139 controls the exposure time in shooting a still image. A shutter actuator 140 moves the shutter 139.

A camera communication circuit 136 sends information on the lens to the camera and receives information on the camera. The information on the lens is information on the zoom state, stop state, focus state, lens frame, and the like. The camera communication circuit 136 transfers these kinds of information to a lens communication circuit 135 incorporated in the camera.

Next, the camera body 138 will be explained.

An optical low-pass filter 106 is an optical element for reducing the false color and moiré of a shot image. An image sensor 107 includes a C-MOS sensor and its peripheral circuit. The image sensor 107 is a two-dimensional 1CCD color sensor in which on-chip primary color mosaic filters with a Bayer array are formed on m×n light receiving pixels.

An electronic flash 115 is used to illuminate an object in shooting. The electronic flash 115 is preferably a flash illumination device using a xenon tube, but may be an illumination device having a continuous emission LED. An AF auxiliary light device 116 projects, to the field via a projection lens, an image of a mask having a predetermined aperture pattern, thereby improving the focus detection capability for a dark object or low-contrast object.

A CPU 121 in the camera executes various control operations of the camera body. The CPU 121 includes an arithmetic unit, ROM, RAM, A/D converter, D/A converter, communication interface circuit, and the like. Based on a predetermined program stored in the ROM, the CPU 121 drives various circuits of the camera to execute a series of operations such as AF, shooting, image processing, and recording.

An electronic flash control circuit 122 controls the ON operation of the electronic flash 115 in synchronism with a shooting operation. An auxiliary light driving circuit 123 controls the ON operation of the AF auxiliary light device 116 in synchronism with a focus detection operation. An image sensor driving circuit 124 controls the image capturing operation of the image sensor 107, A/D-converts an acquired image signal, and transmits the digital data to the CPU 121. An image processing circuit 125 performs processes such as γ conversion, color interpolation, and JPEG compression for an image acquired by the image sensor 107.

A focus driving circuit 126 controls to drive the focus actuator 114 based on the focus detection result. The focus driving circuit 126 drives the third lens group 105 to reciprocate along the optical axis, adjusting the focus. A stop driving circuit 128 controls to drive the stop actuator 112, thereby controlling the aperture of the stop 102. A zoom driving circuit 129 drives the zoom actuator 111 in accordance with a zoom operation by the user. The lens communication circuit 135 communicates with the camera communication circuit 136 in the photographing lens 137. A shutter driving circuit 145 drives the shutter actuator 140.

A display 131 is, for example, an LCD. The display 131 displays information on the shooting mode of the camera, a preview image before shooting, a confirmation image after shooting, an in-focus display image upon focus detection, and the like. Operation switches 132 include a power switch, release (shooting trigger) switch, zoom operation switch, and shooting mode selection switch. A detachable flash memory 133 records a shot image. A camera memory 144 saves various kinds of data necessary for calculation by the CPU 121.

Figure 2:
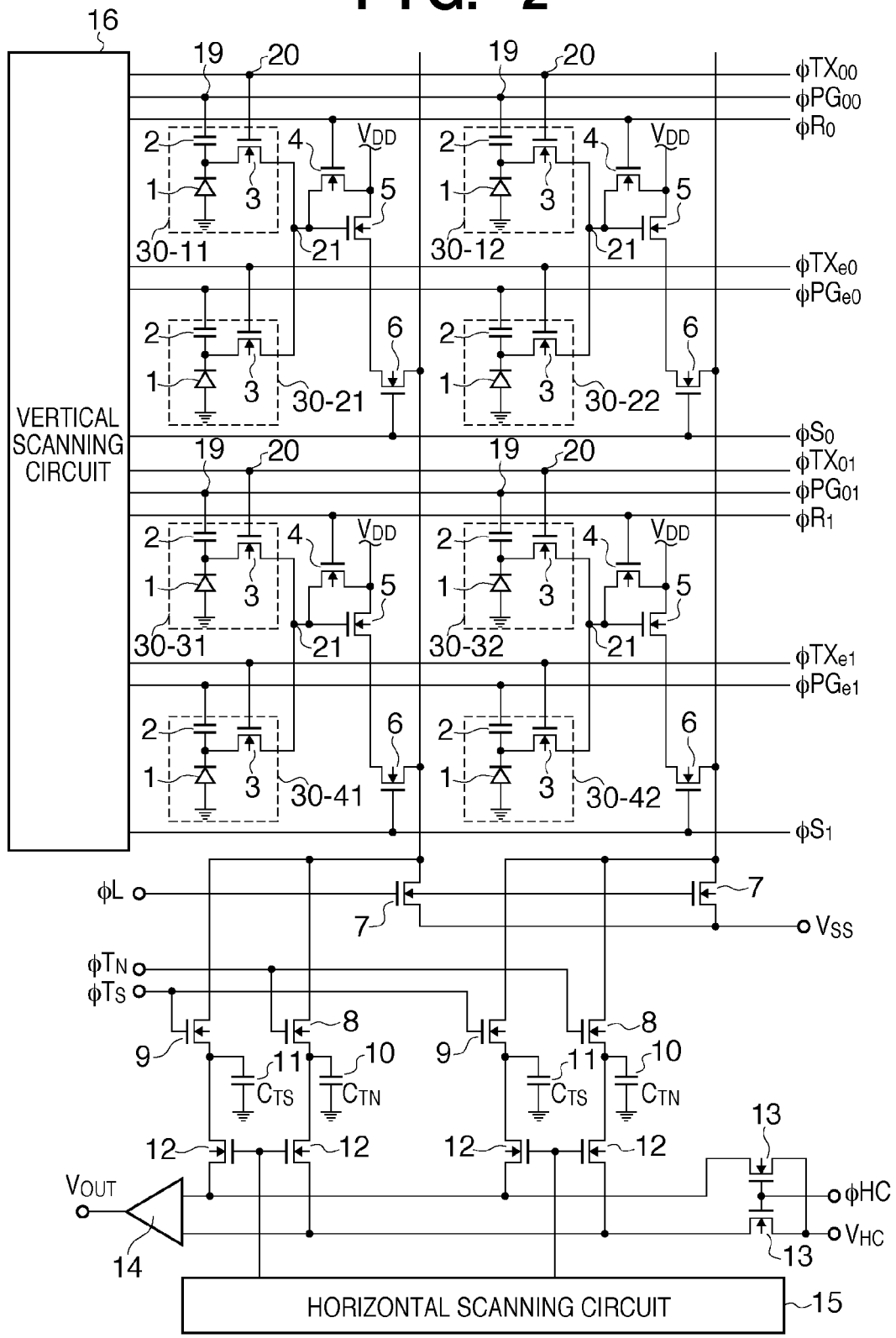
FIG. 2 is a circuit diagram of an image sensor.

FIG. 2 is a circuit diagram showing the schematic circuit arrangement of the image sensor according to the first embodiment. FIG. 2 shows 2×4 pixels of a two-dimensional C-MOS area sensor. When the area sensor is used as an image sensor, many pixels as shown in FIG. 2 are arranged to acquire a high-resolution image. The embodiment will exemplify an image sensor having a pixel pitch of 2 μm, an effective pixel count of 3,000×2,000=6,000,000 pixels, and an image sensing frame size of 6 mm in width×4 mm in length.

In FIG. 2, reference numeral 1 denotes a photoelectric conversion portion of a photoelectric conversion element formed from a MOS transistor gate and a depletion layer below the gate; 2, a photogate; 3, a transfer switch MOS transistor; 4, a reset MOS transistor; and 5, a source follower amplifier MOS transistor. Reference numeral 6 denotes a horizontal selection switch MOS transistor; 7, a load MOS transistor for the source follower; 8, a dark output transfer MOS transistor; 9, a bright output transfer MOS transistor; 10, a dark output accumulation capacitor $C_{TN}$; and 11, a bright output accumulation capacitor $C_{TS}$. Reference numeral 12 denotes a horizontal transfer MOS transistor; 13, a horizontal output line reset MOS transistor; 14, a differential output amplifier; 15, a horizontal scanning circuit; and 16, a vertical scanning circuit.

Figure 3:
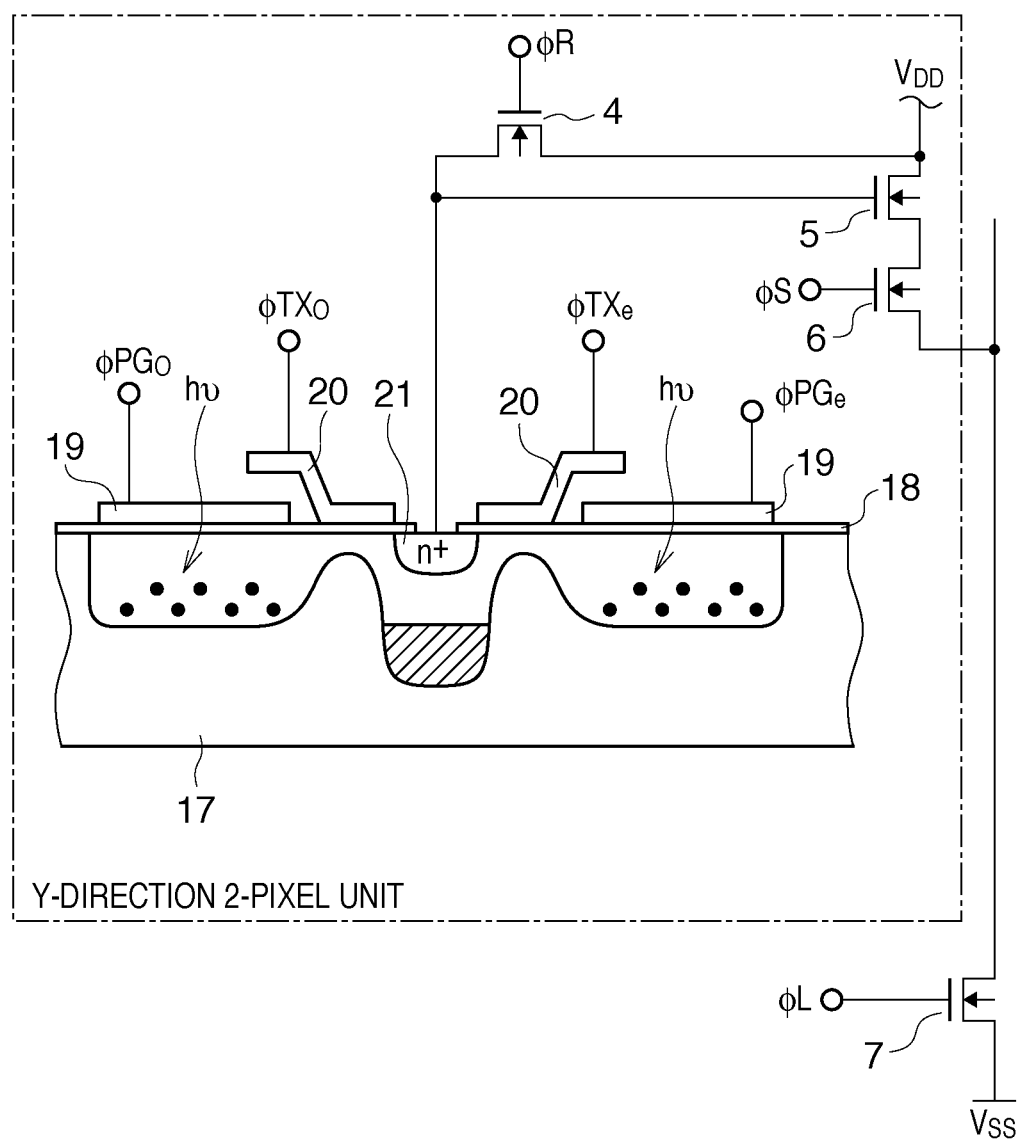
FIG. 3 is a sectional view of the pixel portion of the image sensor.

FIG. 3 is a sectional view showing a pixel portion. In FIG. 3, reference numeral 17 denotes a P-well; 18, a gate oxide film; 19, a first poly-Si layer; 20, a second poly-Si layer; and 21, an $n^+$-floating diffusion region (FD region). The FD region 21 is connected to another photoelectric conversion portion via another transfer MOS transistor. In FIG. 3, the FD region 21 is shared between the drains of two transfer MOS transistors 3 to increase sensitivity by micropatterning and reduction of the capacity of the FD region 21. The FD region 21 may be connected by, e.g., an Al wire.

Figure 4:
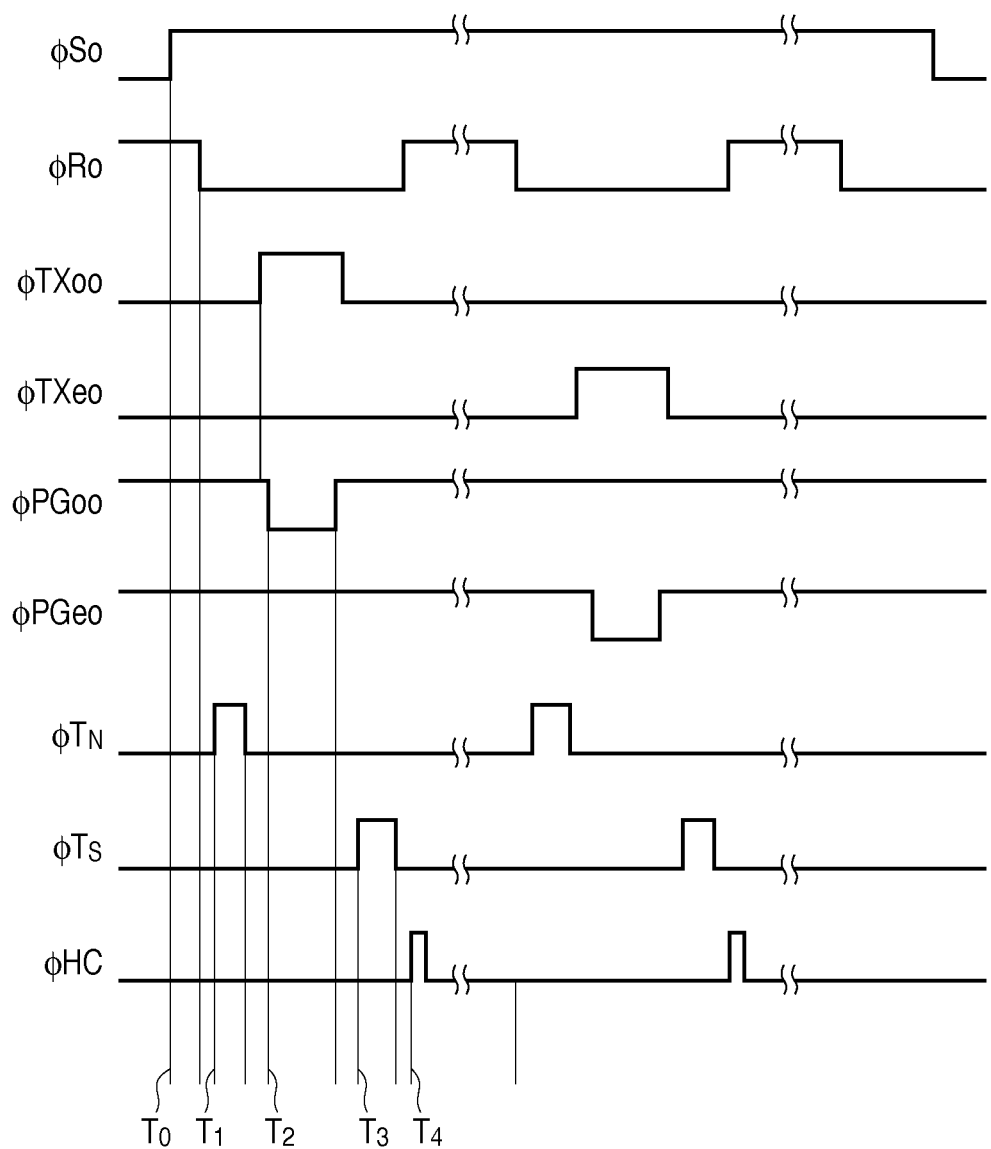
FIG. 4 is a driving timing chart of the image sensor.

The operation of the image sensor will be explained with reference to the timing chart of FIG. 4. This timing chart shows a case of independently outputting signals from all pixels.

In response to a timing output from the vertical scanning circuit 16, a control pulse φL changes to high level to reset a vertical output line. Control pulses $φR_0$, $φPG_{00}$, and $φPG_{e0}$ change to high level to turn on the reset MOS transistor 4 and set the first poly-Si layer 19 of the photogate 2 to high level. At time $T_0$, a control pulse $φS_0$ changes to high level to turn on the selection switch MOS transistor 6 and select pixels on the first and second lines. Then, the control pulse $φR_0$ changes to low level to stop resetting the FD region 21. The FD region 21 changes to a floating state, connecting the gate and source of the source follower amplifier MOS transistor 5. At time $T_1$, a control pulse $φT_N$ changes to high level to output a dark voltage from the FD region 21 to the accumulation capacitor $C_{TN}$ 10 by a source follower operation.

To photoelectrically convert outputs from pixels on the first line, a control pulse $φTX_{00}$ for the first line changes to high level to turn on the transfer switch MOS transistor 3. At time $T_2$, the control pulse $φPG_{00}$ changes to low level. A voltage relationship at this time preferably raises the potential well spreading below the photogate 2 to completely transfer photoinduced carriers to the FD region 21. As long as carriers can be completely transferred, the control pulse φTX may be not a pulse but a fixed potential.

At time $T_2$, charges are transferred from the photoelectric conversion portion 1 of the photodiode to the FD region 21, changing the potential of the FD region 21 in accordance with light. At this time, the source follower amplifier MOS transistor 5 is in the floating state. At time $T_3$, a control pulse $φT_S$ changes to high level to output the potential of the FD region 21 to the accumulation capacitor $C_{TS}$ 11. Up to this time, dark and bright outputs from pixels on the first line have been accumulated in the accumulation capacitors $C_{TN}$ 10 and $C_{TS}$ 11, respectively. At time $T_4$, a control pulse φHC temporarily changes to high level to turn on the horizontal output line reset MOS transistors 13 and reset the horizontal output lines. In the horizontal transfer period, the dark and bright outputs from the pixels are output to the horizontal output lines in response to a scanning timing signal from the horizontal scanning circuit 15. At this time, the differential amplifier 14 outputs a differential output $V_{OUT}$ between the accumulation capacitors $C_{TN}$ 10 and $C_{TS}$ 11, obtaining a signal with high S/N ratio free from random noise and fixed-pattern noise of the pixels. Photocharges in pixels 30-12 and 30-22 are respectively accumulated in the accumulation capacitors $C_{TN}$ 10 and $C_{TS}$ 11 at the same time as those in pixels 30-11 and 30-21. However, the photocharges are read out to the horizontal output lines by delaying the timing pulse from the horizontal scanning circuit 15 by one pixel. Then, the photocharges are output from the differential amplifier 14.

According to the embodiment, the differential output $V_{OUT}$ is obtained within the chip. However, the same effects can be attained using a conventional CDS (Correlated Double Sampling) circuit outside the chip, instead of obtaining the differential output $V_{OUT}$ within the chip.

After outputting a bright output to the accumulation capacitor $C_{TS}$ 11, the control pulse $φR_0$ changes to high level to turn on the reset MOS transistor 4 and reset the FD region 21 to the power supply $V_{DD}$. After the end of horizontal transfer from the first line, photocharges are read out from the second line. In the readout from the second line, the control pulses $φTX_{e0}$ and $φPG_{e0}$ are similarly driven to supply high-level control pulses $φT_N$ and $φT_S$. Photocharges are respectively accumulated in the accumulation capacitors $C_{TN}$ 10 and $C_{TS}$ 11, extracting dark and bright outputs. By this driving, photocharges can be independently read out from the first and second lines. After that, the vertical scanning circuit is driven to read out photocharges from the (2n+1)th and (2n+2)th lines (n=1, 2, . . . ). In this manner, photocharges can be independently output from all pixels. More specifically, for n=1, the control pulse $φS_1$ changes to high level, and then $φR_1$ changes to low level. The control pulses $φT_N$ and $φTX_{01}$ change to high level, the control pulse $φPG_{01}$ changes to low level, and the control pulse $φT_S$ changes to high level. The control pulse φHC temporarily changes to high level, reading out pixel signals from pixels 30-31 and 30-32. Subsequently, the control pulses $φTX_{e1}$ and $φPG_{e1}$ are applied in the above-described way, reading out pixel signals from pixels 30-41 and 30-42.

FIGS. 5A to 7B are views for explaining the structures of an image sensing pixel and focus detection pixel.

The first embodiment adopts a Bayer array in which two pixels having G (Green) spectral sensitivity are diagonally arranged among 2×2=4 pixels, and pixels each having R (Red) or B (Blue) spectral sensitivity are arranged as the remaining two pixels. Focus detection pixels are distributedly arranged between the Bayer arrays under a predetermined rule. A technique of discretely arranging focus detection pixels between image sensing pixels is disclosed in Japanese Patent Laid-Open No. 2000-156823 and the like and is well known, so a description thereof will be omitted.

FIGS. 5A and 5B show the arrangement and structure of image sensing pixels.

FIG. 5A is a plan view of 2×2 image sensing pixels. As is generally known, in the Bayer array, G pixels are diagonally arranged, and R and B pixels are arranged as the two remaining pixels. This 2×2 structure is repetitively arranged.

FIG. 5B is a sectional view taken along the line A-A in FIG. 5A. Reference symbol ML denotes an on-chip microlens arranged in front of each pixel; $CF_R$, an R (Red) color filter; and $CF_G$, a G (Green) color filter. Reference symbol PD (Photo Diode) denotes a schematic photoelectric conversion portion of the C-MOS sensor shown in FIG. 3. Reference symbol CL denotes an interconnection layer for forming a signal line for transmitting various signals within the C-MOS sensor. Reference symbol TL denotes a schematic photographing optical system.

The on-chip microlens ML and photoelectric conversion portion PD of the image sensing pixel are configured to capture a light beam having passed through the photographing optical system TL as effectively as possible. In other words, an exit pupil EP of the photographing optical system TL and the photoelectric conversion portion PD are conjugate to each other via the microlens ML, and the effective area of the photoelectric conversion portion is designed large. FIG. 5B shows a light beam incident on the R pixel, but the G pixel and B (Blue) pixel also have the same structure. The exit pupil EP corresponding to each of R, G, and B image sensing pixels has a large diameter. A light beam traveling from an object can be captured efficiently, increasing the S/N ratio of an image signal.

FIGS. 6A and 6B show the arrangement and structure of focus detection pixels for dividing the pupil in the horizontal direction (lateral direction) of the photographing lens.

FIG. 6A is a plan view of 2×2 pixels including focus detection pixels. When obtaining an image sensing signal, a G pixel provides the main component of luminance information. The human image recognition characteristics are sensitive to luminance information. If G pixels are omitted, degradation of the image quality is readily recognized. To the contrary, R or B pixels acquire color information, and the human image recognition characteristics are not sensitive to color information. Hence, even if some pixels for acquiring color information are omitted, degradation of the image quality is hardly recognized. From this, in the embodiment, G pixels out of 2×2 pixels are left as image sensing pixels, and R and B pixels are replaced with focus detection pixels. In FIG. 6A, $S_{HA}$ and $S_{HB}$ are focus detection pixels.

FIG. 6B is a sectional view taken along the line A-A in FIG. 6A. The microlens ML and photoelectric conversion portion PD have the same structures as those of image sensing pixels (third pixel group) shown in FIG. 5B. In the embodiment, a signal from the focus detection pixel is not used to generate an image, so a transparent film $CF_W$ (White) is arranged in place of the color filter for color separation. To divide the pupil by the image sensor, the aperture of the interconnection layer CL shifts in one direction from the center line of the microlens ML. More specifically, an aperture $OP_{HA}$ of the pixel $S_{HA}$ shifts to the right and receives a light beam having passed through a left exit pupil $EP_{HA}$ of the photographing optical system TL. Similarly, an aperture $OP_{HB}$ of the pixel $S_{HB}$ shifts to the left and receives a light beam having passed through a right exit pupil $EP_{HB}$ of the photographing optical system TL. Pixels $S_{HA}$ are arrayed regularly in the horizontal direction, and an object image (first image signal) acquired by these pixels (first pixel group) is defined as image A. Pixels $S_{HB}$ are also arrayed regularly in the horizontal direction, and an object image (second image signal) obtained by these pixels (second pixel group) is defined as image B. By detecting the relative positions of images A and B, the defocus amount of the photographing lens 137 can be detected.

The microlens ML functions as a lens element for generating a pair of optical images, that is, image A formed by a light beam having passed through the left exit pupil $EP_{HA}$ (first exit pupil region) of the photographing optical system TL and image B formed by a light beam having passed through the right exit pupil $EP_{HB}$ (second exit pupil region) of the photographing optical system TL.

The pixels $S_{HA}$ and $S_{HB}$ enable focus detection for an object, for example, a longitudinal line having a luminance distribution in the lateral direction of the photographing frame, but cannot do it for a lateral line having a luminance distribution in the longitudinal direction. Thus, the embodiment adopts a pixel for dividing the pupil even in the vertical direction (longitudinal direction) of the photographing lens so that focus detection can be performed in even the latter case.

FIGS. 7A and 7B show the arrangement and structure of focus detection pixels for dividing the pupil in the vertical direction of the photographing lens. FIG. 7A is a plan view of 2×2 pixels including focus detection pixels. Similar to FIG. 6A, G pixels are left as image sensing pixels, and R and B pixels are replaced with focus detection pixels. In FIG. 7A, $S_{VC}$ and $S_{VD}$ are focus detection pixels.

FIG. 7B is a sectional view taken along the line A-A in FIG. 7A. The pixel in FIG. 7B has the same structure as that in FIG. 6B except that the pixel in FIG. 6B has a structure for dividing the pupil in the lateral direction, but the pixel in FIG. 7B has a structure for dividing the pupil in the longitudinal direction. An aperture $OP_{VC}$ of the pixel $S_{VC}$ shifts down and receives a light beam having passed through an upper exit pupil $EP_{VC}$ of the photographing optical system TL. Similarly, an aperture $OP_{VD}$ of the pixel $S_{VD}$ shifts up and receives a light beam having passed through a lower exit pupil $EP_{VD}$ of the photographing optical system TL. Pixels $S_{VC}$ are arrayed regularly in the vertical direction, and an object image obtained by these pixels is defined as image C. Pixels $S_{VD}$ are also arrayed regularly in the vertical direction, and an object image obtained by these pixels is defined as image D. By detecting the relative positions of images C and D, the defocus amount of the object image having a luminance distribution in the vertical direction can be detected.

Figure 8:
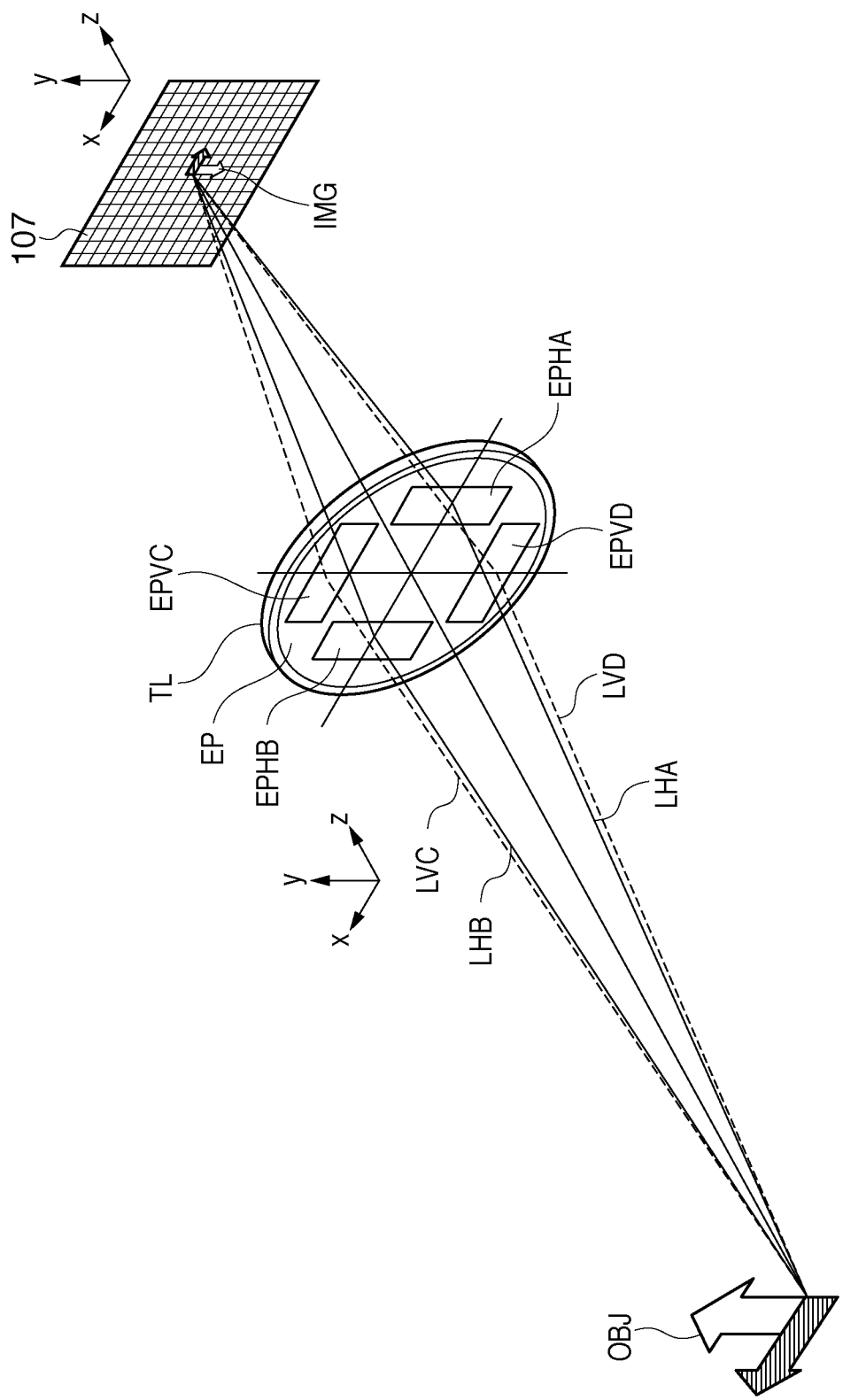
FIG. 8 is a conceptual view for explaining pupil division of the image sensor.

FIG. 8 is a view for explaining the concept of pupil division of the image sensor in the first embodiment.

Reference symbol TL denotes a photographing lens; 107, an image sensor; OBJ, an object; and IMG, an object image.

As described with reference to FIGS. 5A and 5B, an image sensing pixel receives a light beam having passed through the entire exit pupil EP of the photographing lens. To the contrary, a focus detection pixel has the pupil-dividing function as described with reference to FIGS. 6A, 6B, 7A, and 7B. More specifically, the pixel $S_{HA}$ in FIGS. 6A and 6B receives a light beam having passed through the left pupil when the rear end of the lens is viewed from the image sensing surface, that is, a light beam having passed through a pupil EPHA in FIG. 8. Similarly, the pixels $S_{HB}$, $S_{VC}$, and $S_{VD}$ receive light beams having passed through pupils EPHB, EPVC, and EPVD, respectively. Focus detection pixels are distributed in the entire region of the image sensor 107 and can detect the focus in the entire image sensing region.

Figure 9:
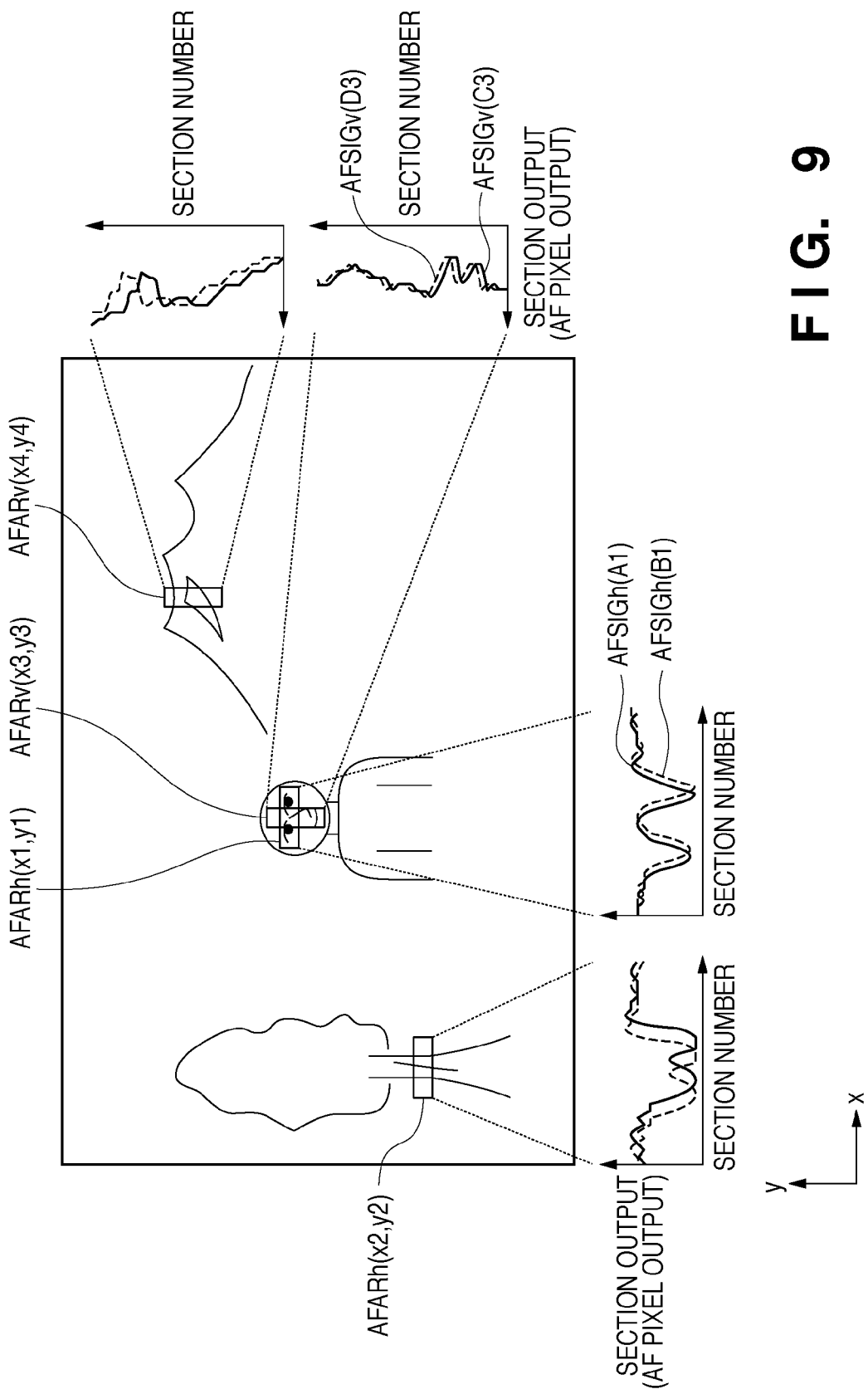
FIG. 9 is a view for explaining a focus detection region.

FIG. 9 is a view for explaining an image acquired in focus detection and a focus detection region.

In FIG. 9, an object image formed on the image sensing surface contains a person at the center, a tree in the foreground on the left side, and mountains in the background on the right side. In the embodiment, pairs each including pixels $S_{HA}$ and $S_{HB}$ for lateral shift detection and pairs each including pixels $S_{VC}$ and $S_{VD}$ for longitudinal shift detection are arranged as focus detection pixels at equal densities in the entire image sensing region. Both pairs of pixels $S_{HA}$ and $S_{HB}$ and pairs of pixels $S_{VC}$ and $S_{VD}$ are arranged in pupil-dividing directions. The pupil-dividing direction of the pixels $S_{HA}$, and $S_{HB}$, is the x direction, so the pixels $S_{HA}$ and $S_{HB}$ are arranged in the x direction. The pupil-dividing direction of the pixels $S_{VC}$ and $S_{VD}$ is the y direction. In lateral shift detection, a pair of image signals obtained from a pair of pixels $S_{HA}$ and $S_{HB}$ for lateral shift detection are used as AF pixel signals for calculating the phase difference. In longitudinal shift detection, a pair of image signals obtained from a pair of pixels $S_{VC}$ and $S_{VD}$ for longitudinal shift detection are used as AF pixel signals for calculating the phase difference. Distance measurement regions for lateral shift detection and longitudinal shift detection can be set at arbitrary positions in the image sensing region.

In FIG. 9, a person's face exists at the center of the frame. When the presence of the face is detected by a known face recognition technique, a focus detection region AFARh(x1, y1) for lateral shift detection and a focus detection region AFARv(x3,y3) for longitudinal shift detection are set using the face region as a center. The suffix "h" represents the horizontal direction, and (x1,y1) and (x3,y3) indicate the coordinates of the upper left corners of focus detection regions. AFSIGh(A1) is an image A signal for phase difference detection obtained by coupling, for 30 sections, focus detection pixels $S_{HA}$ for lateral shift detection in each section of the focus detection region AFARh(x1,y1). Similarly, AFSIGh(B1) is an image B signal for phase difference detection obtained by coupling, for 30 sections, focus detection pixels $S_{HB}$ for lateral shift detection in each section. The relative lateral shift amounts of the image A signal AFSIGh(A1) and image B signal AFSIGh(B1) are calculated by a known correlation calculation, obtaining the defocus amount of the photographing lens 137.

The defocus amount in the focus detection region AFARv(x3,y3) is also obtained in the same way. Two defocus amounts detected in the focus detection regions for lateral shift and longitudinal shift are compared, and a value of higher reliability is adopted.

A case in which a portion near the trunk of the tree on the left side in the frame is designated as a focus detection position will be considered. The trunk of the tree mainly has a longitudinal line component, that is, a luminance distribution in the lateral direction. It is determined that the trunk is an object suitable for lateral shift detection. A focus detection region AFARh(x2,y2) for lateral shift detection is set. When the ridgeline of the mountains on the right side in the frame is designated as a focus detection position, it is determined that the ridgeline is an object suitable for longitudinal shift detection. This is because the ridgeline mainly has a lateral line component, that is, a luminance distribution in the longitudinal direction. A focus detection region AFARv(x4,y4) for longitudinal shift detection is set.

As described above, according to the first embodiment, focus detection regions for lateral shift detection and longitudinal shift detection can be set at arbitrary positions in the frame. Even if the projection position of an object and the direction of the luminance distribution vary, the focus can always be detected accurately.

Figure 10:
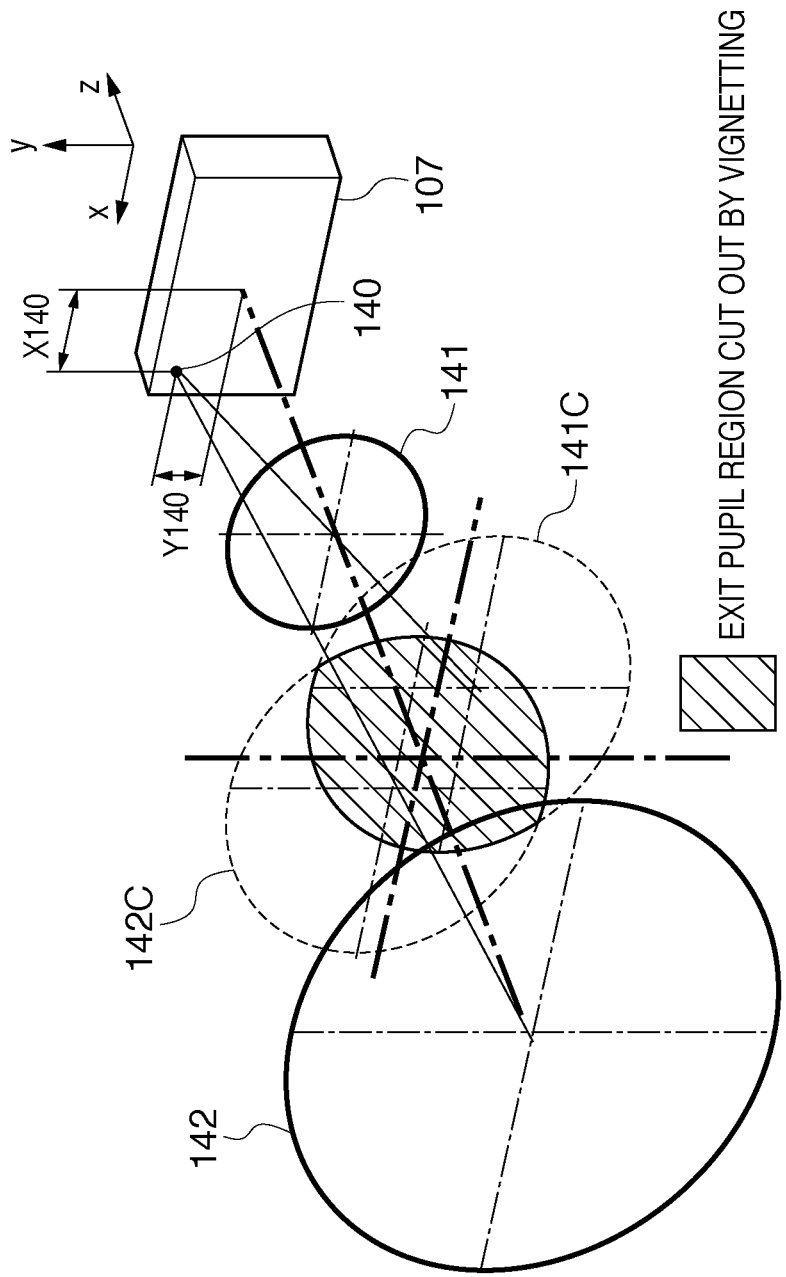
FIG. 10 is a view for explaining a state in which the exit pupil is limited.

FIGS. 10 to 13 are views for explaining a state in which the exit pupil is limited by vignetting of the photographing lens 137. For descriptive convenience, the model is simplified on the premise that the exit pupil is limited by two lens frames of the photographing lens 137. FIG. 10 is a view showing lens frames projected on the exit pupil of the photographing lens 137. FIG. 10 is a perspective view when viewed from quadrants defined by three, −X, +Y, and −Z axes. In FIG. 10, reference numeral 107 denotes an image sensor; 141 and 142, lens frames of the photographing lens 137; and 141C and 142C, lens frames obtained by projecting the lens frames 141 and 142 on the exit pupil of the photographing lens 137. A point 140 has an image height $X_{140}$ in the +X direction and an image height $Y_{140}$ in the Y direction on the light receiving surface of the image sensor 107. Light which reaches the optical axis of the light receiving surface of the image sensor 107 is not eclipsed by the lens frame of the photographing lens 137, and has passed through the entire exit pupil EP shown in FIG. 8. When the point 140 is viewed from the photographing lens 137, as the lens frame 141 seems to be the lens frame 141C shifted in the −X and −Y directions on the exit pupil, and the lens frame 142 seems to be the lens frame 142C shifted in the +X and −Y directions on the exit pupil. Light which reaches the point 140 has passed through a region (hatched portion in FIG. 10) cut out by the lens frames 141C and 142C from the entire exit pupil EP shown in FIG. 8.

A change of the lens frames 141C and 142C projected on the exit pupil depending on the image height $X_{140}$ will be explained with reference to FIG. 11.

Figure 11:
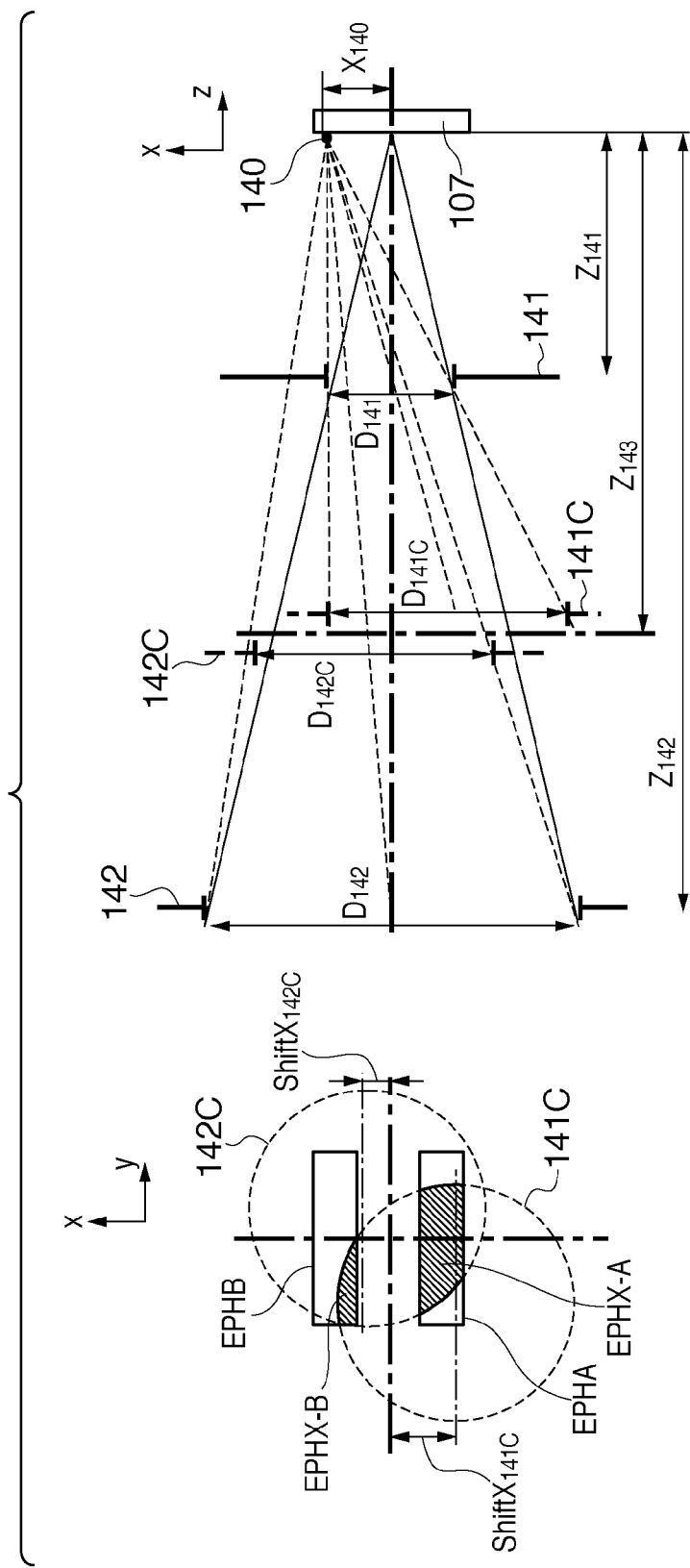
FIG. 11 is a view for explaining a state in which the exit pupil is limited.

FIG. 11 shows two views when viewed from the +Y and −Z directions, respectively. $Z_{141}$ is a distance from the image sensor 107 to the lens frame 141, $Z_{142}$ is a distance from the image sensor 107 to the lens frame 142, and $Z_{143}$ is a distance from the image sensor 107 to the exit pupil. $D_{141}$ is the aperture diameter of the lens frame 141, and $D_{142}$ is that of the lens frame 142. EPHA is the pupil of the pixel $S_{HA}$, and EPHB is that of the pixel $S_{HB}$. EPHX-A is a pupil formed by limiting the pupil EPHA by vignetting of the photographing lens 137, and EPHX-B is a pupil formed by limiting the pupil EPHB by vignetting of the photographing lens 137. From FIG. 11, an X shift amount ShiftX$_{141C}$ of the lens frame 141C projected on the exit pupil from the optical axis, an aperture diameter $D_{141C}$, an X shift amount ShiftX$_{142C}$ of the lens frame 142C projected on the exit pupil from the optical axis, and an aperture diameter $D_{142C}$ are given by $$\text{ShiftX}_{141C} = X_{140} \cdot (Z_{143} - Z_{141})/Z_{141} \tag{1}$$

$$D_{141C} = D_{141} \cdot Z_{143}/Z_{141} \tag{2}$$

$$\text{ShiftX}_{142C} = X_{140} \cdot (Z_{142} - Z_{143})/Z_{142} \tag{3}$$

$$D_{142C} = D_{142} \cdot Z_{143}/Z_{142} \tag{4}$$

As is apparent from equations (1) to (4), the lens frames 141C and 142C projected on the exit pupil change depending on the image height $X_{140}$.

Figure 12:
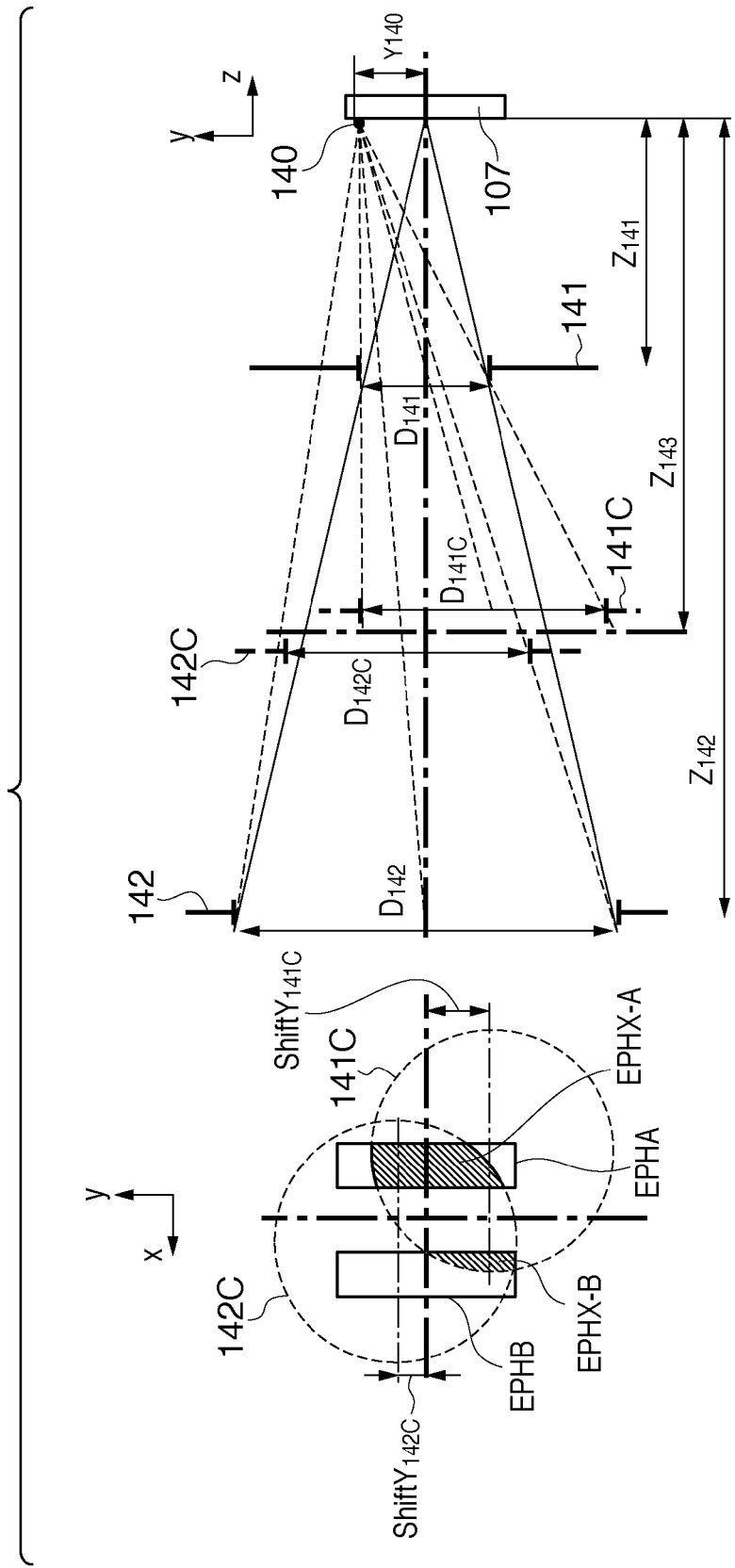
FIG. 12 is a view for explaining a state in which the exit pupil is limited.

A change of the lens frames 141C and 142C projected on the exit pupil depending on the image height $Y_{140}$ will be explained with reference to FIG. 12. FIG. 12 shows two views when viewed from the −X and −Z directions, respectively. From FIG. 12, a Y shift amount $\text{ShiftY}_{141C}$ of the lens frame 141C projected on the exit pupil from the optical axis, the aperture diameter $D_{141C}$, a Y shift amount $\text{ShiftY}_{142C}$ of the lens frame 142C projected on the exit pupil from the optical axis, and the aperture diameter $D_{142C}$ are given by $$\text{ShiftY}_{141C} = Y_{140} \cdot (Z_{143} - Z_{141})/Z_{141} \qquad (5)$$

$$\text{ShiftY}_{142C} = Y_{140} \cdot (Z_{142} - Z_{143})/Z_{142} \qquad (6)$$

As is apparent from equations (5) and (6), the lens frames 141C and 142C projected on the exit pupil change depending on the image height $Y_{140}$, too.

The exit pupil EPHA of the pixel $S_{HA}$ and the exit pupil EPHB of the pixel $S_{HB}$ are limited by an aperture with the diameter $D_{141C}$ that shifts from the optical axis by $\text{ShiftX}_{141C}$ in the X direction and $\text{ShiftY}_{141C}$ in the Y direction, and an aperture with the diameter $D_{142C}$ that shifts from the optical axis by $\text{ShiftX}_{142C}$ in the X direction and $\text{ShiftY}_{142C}$ in the Y direction. As a result, the exit pupil EPHA is limited to the exit pupil EPHX-A, and the exit pupil EPHB is limited to the exit pupil EPHX-B.

The barycenters of the exit pupils EPHX-A and EPHX-B formed by vignetting of the photographing lens 137 will be explained with reference to FIG. 13.

Figure 13:
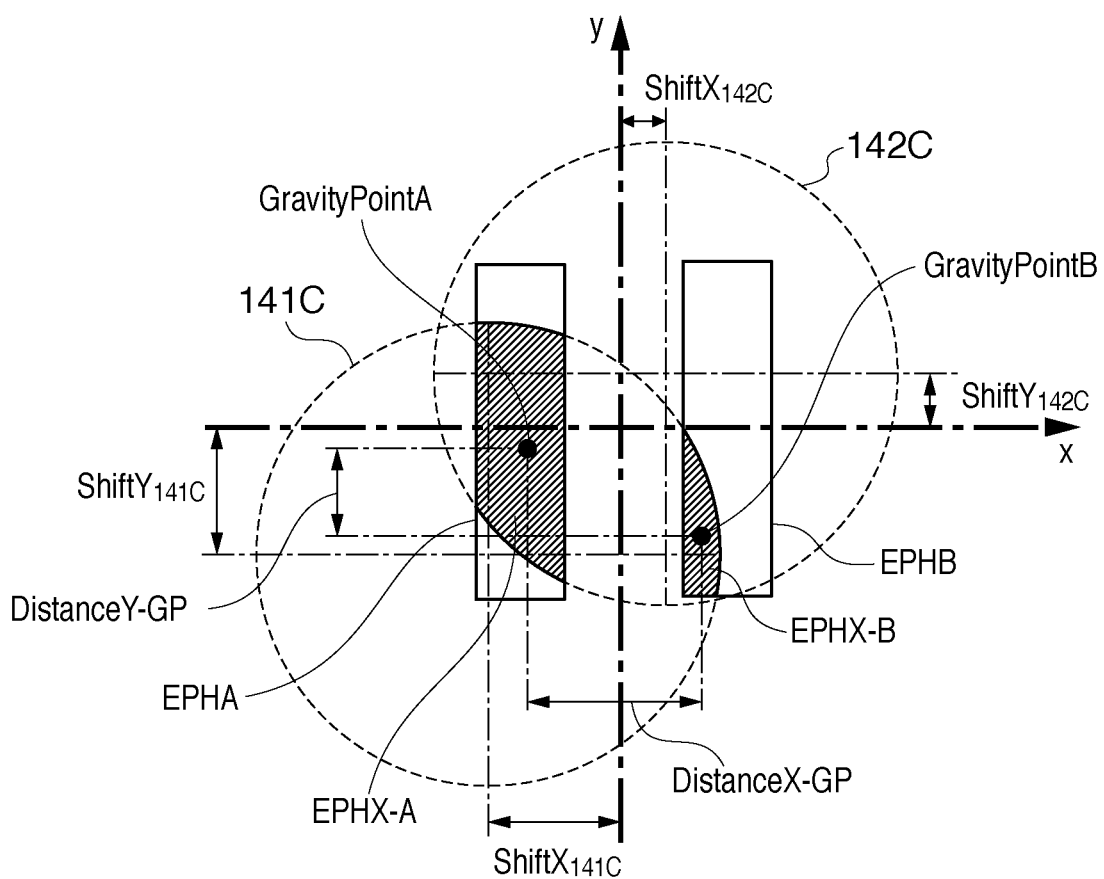
FIG. 13 is a view for explaining a state in which the exit pupil is limited.

FIG. 13 is a view of the exit pupil of the photographing lens 137 when viewed from the +Z direction. The exit pupil EPHA of the pixel $S_{HA}$ and the exit pupil EPHB of the pixel $S_{HB}$ are cut out by an aperture with the diameter $D_{141C}$ that shifts from the optical axis by $\text{ShiftX}_{141C}$ in the X direction and $\text{ShiftY}_{141C}$ in the Y direction, and an aperture with the diameter $D_{142C}$ that shifts from the optical axis by $\text{ShiftX}_{142C}$ in the X direction and $\text{ShiftY}_{142C}$ in the Y direction. The exit pupils EPHA and EPHB are limited to the exit pupils EPHX-A and EPHX-B, respectively. The barycenter of the exit pupil EPHX-A is defined as GravityPointA, and that of the exit pupil EPHX-B is defined as GravityPointB. While the barycenter GravityPointA of the exit pupil EPHX-A hardly moves in the Y direction, the barycenter GravityPointB of the exit pupil EPHX-B greatly moves in the −Y direction. A line connecting the barycenter GravityPointA of the exit pupil EPHX-A and the barycenter GravityPointB of the exit pupil EPHX-B inclines from the X-axis. Letting DistanceX-GP be the x component of a vector connecting the barycenter GravityPointA of the exit pupil EPHX-A and the barycenter GravityPointB of the exit pupil EPHX-B, and DistanceY-GP be the y component, an exit pupil barycenter inclination INCL is calculated by $$\text{exit pupil barycenter inclination } INCL = \text{Distance}Y\text{-}GP/\text{Distance}X\text{-}GP \qquad (7)$$

As described with reference to FIG. 9, the pixels $S_{HA}$ and $S_{HB}$ are arranged in the X direction. However, the line connecting the barycenters GravityPointA and GravityPointB inclines from the X direction. Light beams having passed through the exit pupils EPHX-A and EPHX-B move in a direction inclined by INCL in accordance with the focus state of the photographing lens 137. That is, the pixel arrangement direction and image moving direction do not coincide with each other.

A problem arising when the pixel arrangement direction and image moving direction do not coincide with each other will be explained with reference to FIGS. 14A to 19.

Figure 14A:
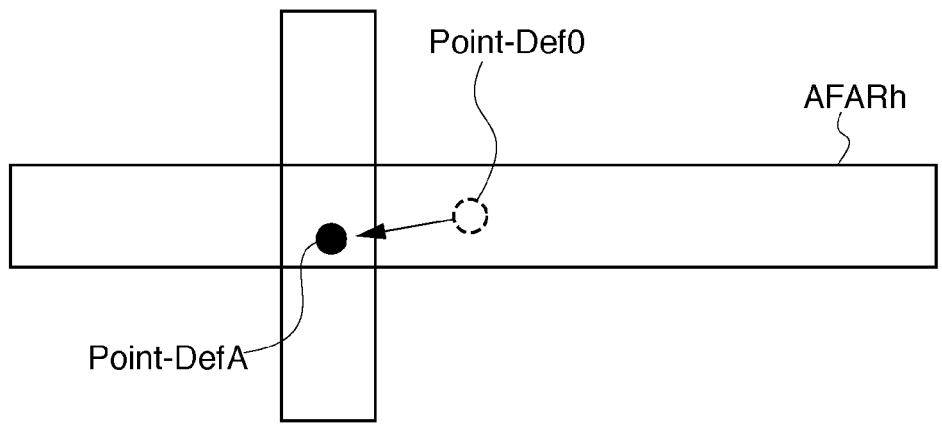
FIGS. 14A and 14B are views for explaining a problem arising when the pixel arrangement direction and image moving direction do not coincide with each other.
Figure 14B:
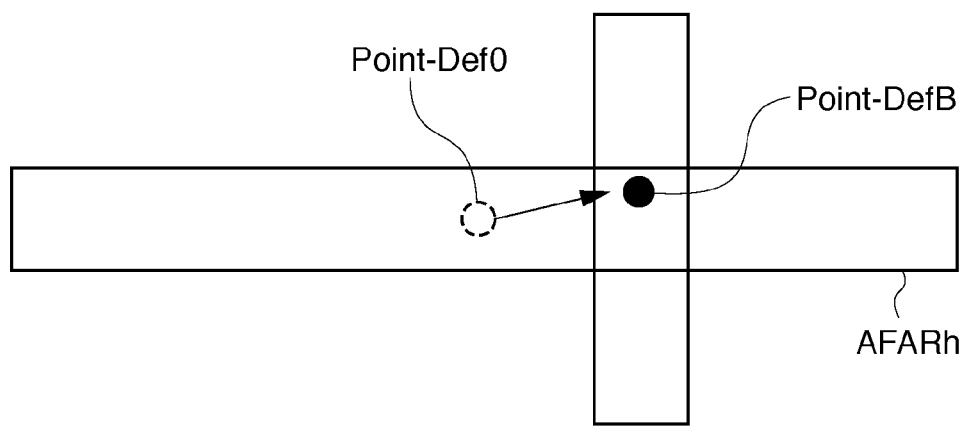

FIGS. 14A and 14B show one longitudinal line projected in a focus detection region AFARh. FIG. 14A shows one longitudinal line received by the pixel $S_{HA}$ in the focus detection region AFARh. FIG. 14B shows one longitudinal line received by the pixel $S_{HB}$. In FIGS. 14A and 14B, a pair of pixels $S_{HA}$ and $S_{HB}$ are aligned in the lateral direction and detect a lateral image moving amount. Referring to FIG. 14A, Point-Def0 is a position where the image of one longitudinal line is projected when the photographing lens 137 is in focus. If the photographing lens 137 becomes out of focus, the image of one longitudinal line received by the pixel $S_{HA}$ moves down to the left along a direction inclined from the horizontal direction by the exit pupil barycenter inclination INCL. Point-DefA is the position of one longitudinal line received by the pixel $S_{HA}$. Referring to FIG. 14B, Point-Def0 is a position where the image of one longitudinal line is projected when the photographing lens 137 is in focus. If the photographing lens 137 becomes out of focus, the image of one longitudinal line received by the pixel $S_{HB}$ moves up to the right along the direction inclined from the horizontal direction by the exit pupil barycenter inclination INCL. Point-DefB is the position of one longitudinal line received by the pixel $S_{HB}$. In other words, one longitudinal line received by the pixel $S_{HA}$ and one longitudinal line received by the pixel $S_{HB}$ move in opposite directions along the direction inclined from the horizontal direction by the exit pupil barycenter inclination INCL.

Figure 15:
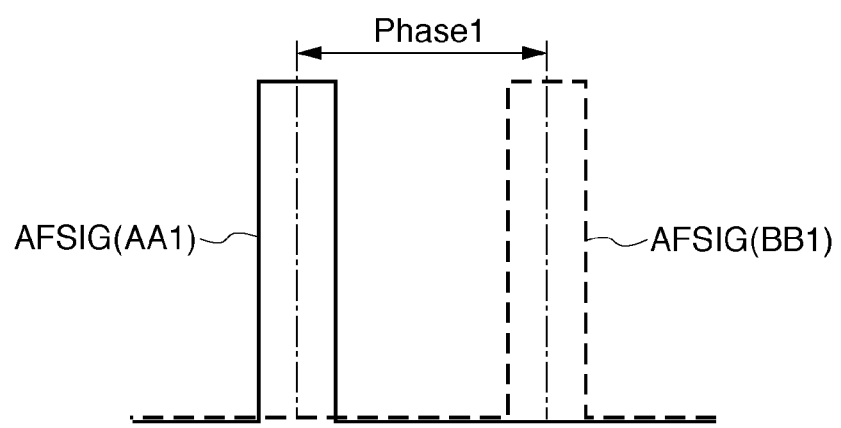
FIG. 15 is a view for explaining the problem arising when the pixel arrangement direction and image moving direction do not coincide with each other.

FIG. 15 shows image signals obtained from a pair of pixels $S_{HA}$ and $S_{HB}$. In FIG. 15, AFSIG(AA1) is an image signal obtained from the pixel $S_{HA}$, and AFSIG(BB1) is an image signal obtained from the pixel $S_{HB}$. At this time, AFSIG (AA1) and AFSIG(BB1) have a phase difference Phase1.

Figure 16A:
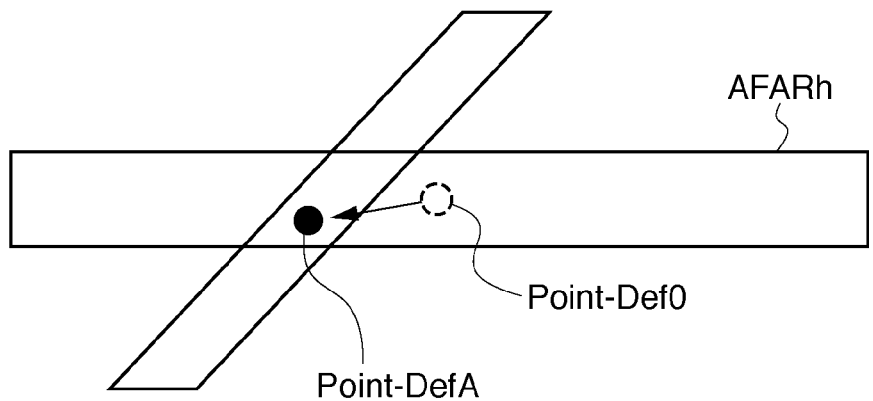
FIGS. 16A and 16B are views for explaining the problem arising when the pixel arrangement direction and image moving direction do not coincide with each other.
Figure 16B:
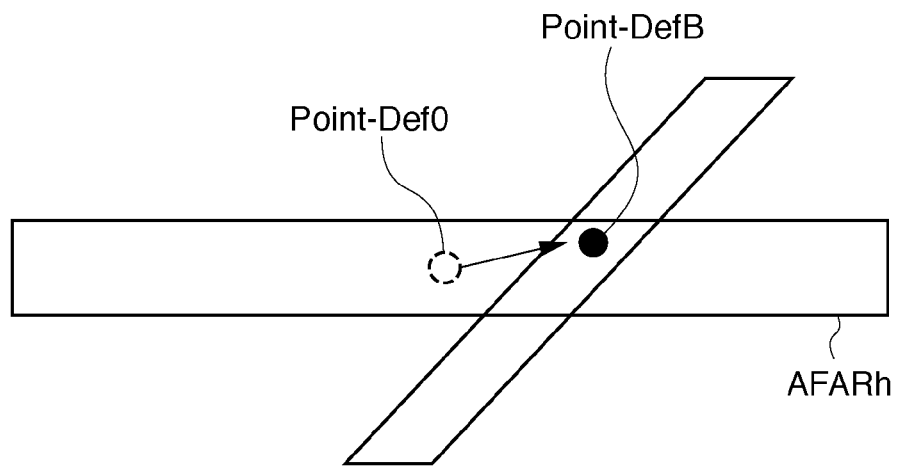
Figure 17:
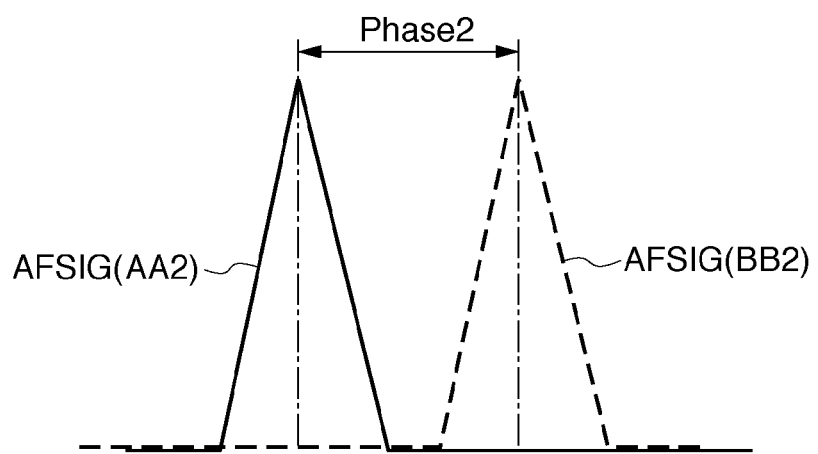
FIG. 17 is a view for explaining the problem arising when the pixel arrangement direction and image moving direction do not coincide with each other.

A case in which the image of one line inclined clockwise by 45° is projected in the focus detection region AFARh will be examined with reference to FIGS. 16A, 16B, and 17.

FIGS. 16A and 16B show the image of one line inclined clockwise by 45° that is projected in the focus detection region AFARh. FIG. 16A shows one line inclined clockwise by 45° that is sensed by the pixel $S_{HA}$ in the focus detection region AFARh. FIG. 16B shows one line inclined clockwise by 45° that is sensed by the pixel $S_{HB}$. Referring to FIG. 16A, Point-Def0 is a position where the image of one line inclined clockwise by 45° is projected when the photographing lens 137 is in focus. If the photographing lens 137 becomes out of focus, the image of one line inclined clockwise by 45° that is sensed by the pixel $S_{HA}$, moves down to the left along a direction inclined from the horizontal direction by the exit pupil barycenter inclination INCL. Point-DefA is the position of one longitudinal line received by the pixel $S_{HA}$. Referring to FIG. 16B, Point-Def0 is a position where the image of one line inclined clockwise by 45° is projected when the photographing lens 137 is in focus. If the photographing lens 137 becomes out of focus, the image of one line inclined clockwise by 45° that is sensed by the pixel $S_{HB}$ moves up to the right along the direction inclined from the horizontal direction by the exit pupil barycenter inclination INCL. Point-DefB is the position of one line inclined clockwise by 45° that is sensed by the pixel $S_{HB}$. That is, an image received by the pixel $S_{HA}$ and an image received by the pixel $S_{HB}$ move in opposite directions along the direction inclined from the horizontal direction by the exit pupil barycenter inclination INCL.

FIG. 17 shows image signals obtained from the pixels $S_{HA}$ and $S_{HB}$. In FIG. 17, AFSIG(AA2) is an image signal obtained from the pixel $S_{HA}$, and AFSIG(BB2) is an image signal obtained from the pixel $S_{HB}$. For one line inclined clockwise by 45°, the image signal AFSIG(AA2) obtained from the pixel $S_{HA}$ moves to the right under the influence of Point-DefA moved down from Point-Def0. To the contrary, the image signal AFSIG(BB2) obtained from the pixel $S_{HB}$ moves to the left under the influence of Point-DefB moved up from Point-Def0. Then, the phase difference between AFSIG (AA2) and AFSIG(BB2) becomes Phase2, which is smaller than the phase difference Phase1 for one longitudinal line.

Figure 18A:
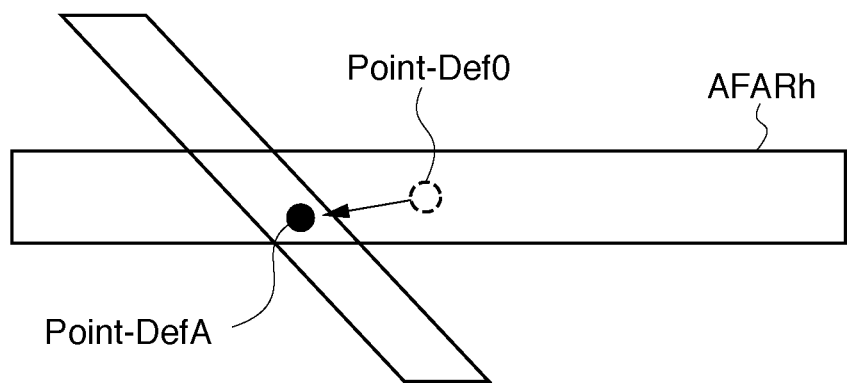
FIGS. 18A and 18B are views for explaining the problem arising when the pixel arrangement direction and image moving direction do not coincide with each other.
Figure 18B:
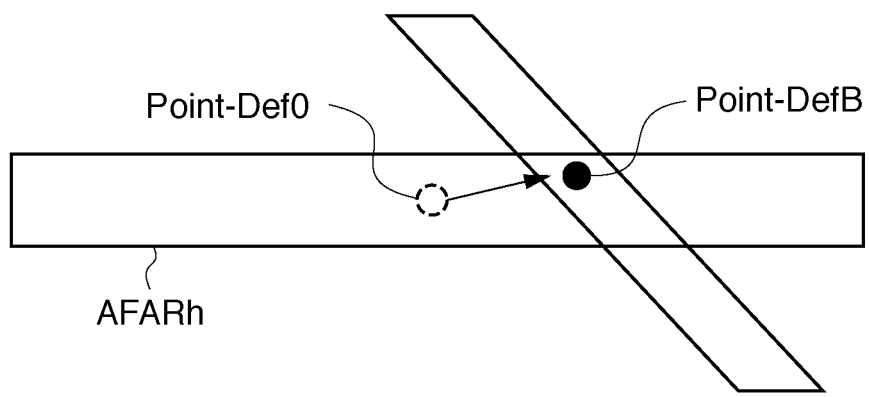

FIGS. 18A and 18B show the image of one line inclined counterclockwise by 45° that is projected in the focus detection region AFARh. FIG. 18A shows one line inclined counterclockwise by 45° that is sensed by the pixel $S_{HA}$ in the focus detection region AFARh. FIG. 18B shows one line inclined counterclockwise by 45° that is sensed by the pixel $S_{HB}$. Referring to FIG. 18A, Point-Def0 is a position where the image of one line inclined counterclockwise by 45° is projected when the photographing lens 137 is in focus. If the photographing lens 137 becomes out of focus, the image of one line inclined counterclockwise by 45° that is sensed by the pixel $S_{HA}$ moves down to the left along a direction inclined from the horizontal direction by the exit pupil barycenter inclination INCL. Point-DefA is the position of one longitudinal line received by the pixel $S_{HA}$. Referring to FIG. 18B, Point-Def0 is a position where the image of one line inclined counterclockwise by 45° is projected when the photographing lens 137 is in focus. If the photographing lens 137 becomes out of focus, the image of one line inclined counterclockwise by 45° that is sensed by the pixel $S_{HB}$ moves up to the right along the direction inclined from the horizontal direction by the exit pupil barycenter inclination INCL. Point-DefB is the position of one line inclined counterclockwise by 45° that is sensed by the pixel $S_{HB}$. That is, an image received by the pixel $S_{HA}$ and an image received by the pixel $S_{HB}$ move in opposite directions along the direction inclined from the horizontal direction by the exit pupil barycenter inclination INCL.

Figure 19:
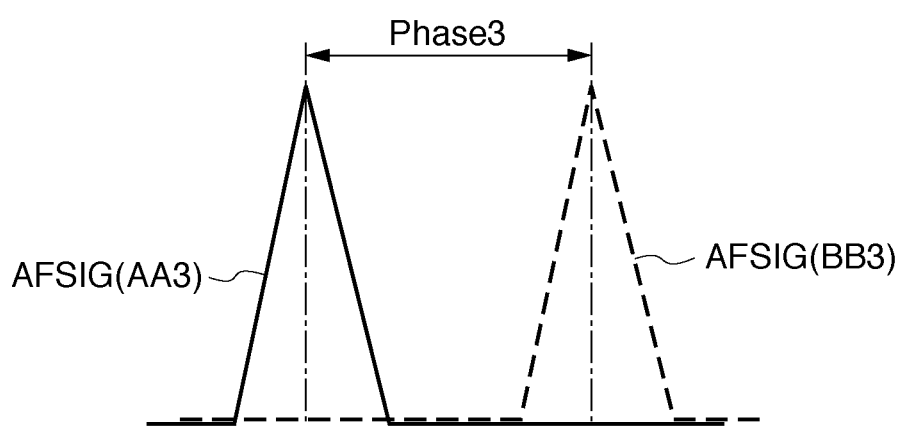
FIG. 19 is a view for explaining the problem arising when the pixel arrangement direction and image moving direction do not coincide with each other.

FIG. 19 shows image signals obtained from the pixels $S_{HA}$ and $S_{HB}$. In FIG. 19, AFSIG(AA3) is an image signal obtained from the pixel $S_{HA}$, and AFSIG(BB3) is an image signal obtained from the pixel $S_{HB}$. For one line inclined counterclockwise by 45°, the image signal AFSIG(AA3) obtained from the pixel $S_{HA}$ moves to the left under the influence of Point-DefA moved down from Point-Def0. In contrast, the image signal AFSIG(BB3) obtained from the pixel $S_{HB}$ moves to the right under the influence of Point-DefB moved up from Point-Def0. Then, the phase difference between AFSIG(AA3) and AFSIG(BB3) becomes Phase3, which is larger than the phase difference Phase1 for one longitudinal line.

As described with reference to FIGS. 14A to 19, when the pixel arrangement direction and image moving direction do not coincide with each other, phase difference detection results differ from each other depending on the pattern of a projected image. In focus detection by the phase difference detection method, the focus state of the photographing lens 137 is detected based on the phase difference between a pair of image signals. An error in phase difference detection error directly leads to a focus detection error. To prevent this, the image capturing apparatus in the first embodiment determines a focus detection range based on the exit pupil barycenter inclination INCL, and can implement high-precision focus detection without increasing the focus detection error. The image capturing apparatus can therefore reduce a focus detection error caused by vignetting of the photographing lens 137.

Figure 20:
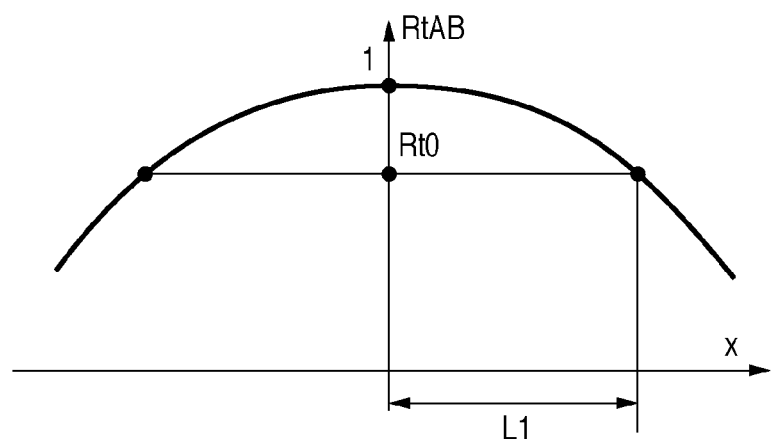
FIG. 20 is a graph showing the relationship between the light quantity ratio RtAB and the image height in the X direction.
Figure 21:
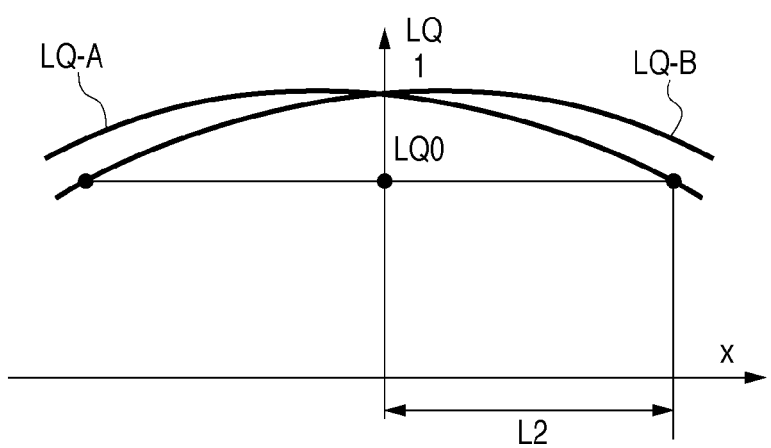
FIG. 21 is a graph showing the relationship between light quantities LQ-A and LQ-B and the image height in the X direction.
Figure 22:
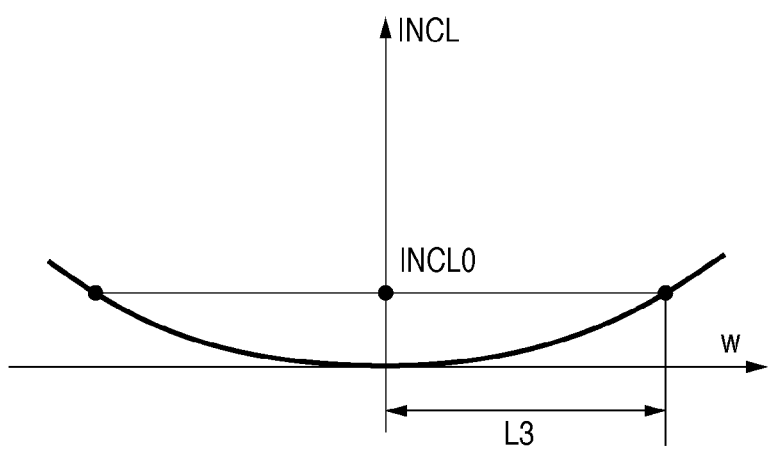
FIG. 22 is a graph showing the relationship between the exit pupil barycenter inclination INCL and the image height in the W direction.

FIGS. 20 to 22 show an image height determined as a focus detection range based on respective parameters. As a feature of the first embodiment, the focus detection range is determined in consideration of the inclination of the exit pupil barycenter in the pixel arrangement direction, in addition to the light quantities and light quantity ratio of a pair of pixels $S_{HA}$ and $S_{HB}$.

FIG. 20 is a graph showing the relationship between the ratio of light quantities received by a pair of pixels $S_{HA}$ and $S_{HB}$ and the image height in the X direction. As described with reference to FIGS. 10 to 13, when the image height changes, the exit pupils of a pair of pixels $S_{HA}$ and $S_{HB}$ are limited to EPHX-A and EPHX-B owing to vignetting of the photographing lens 137 (see FIG. 13). The exit pupils EPHX-A and EPHX-B are different in area, so a light quantity received by the pixel $S_{HA}$ and that received by the pixel $S_{HB}$ differ from each other. The ratio of light quantities received by the pixels $S_{HA}$ and $S_{HB}$ will be called a light quantity ratio RtAB. The pixels $S_{HA}$ and $S_{HB}$ divide the pupil in the X direction. Thus, the light quantity ratio greatly changes when the image height changes in the X direction. As shown in FIG. 20, the light quantity ratio RtAB is calculated for each image height in the X direction. A range L1 where the light quantity ratio RtAB falls between a given threshold Rt0 and 1 is set as a focus detection range.

Referring to FIG. 20, the abscissa axis represents the image height in the X direction, and the ordinate axis represents the light quantity ratio RtAB. The light quantity ratio RtAB shown in FIG. 20 is calculated to be a numerical value always smaller than 1 by setting a larger one of light quantities received by the pixels $S_{HA}$ and $S_{HB}$ as a denominator and a smaller one as a numerator. In this way, a range where a light quantity received by the pixel $S_{HA}$ and that received by the pixel $S_{HB}$ greatly differ from each other due to vignetting of the photographing lens 137 is excluded from the focus detection range. This enables high-precision focus detection without increasing a focus detection error caused by vignetting of the photographing lens 137.

FIG. 21 shows the relationship between light quantities received by a pair of pixels $S_{HA}$ and $S_{HB}$ and the image height in the X direction. As described with reference to FIGS. 10 to 13, when the image height changes, the exit pupils of a pair of pixels $S_{HA}$ and $S_{HB}$ are limited to EPHX-A and EPHX-B owing to vignetting of the photographing lens 137 (see FIG. 13). The areas of the exit pupils EPHX-A and EPHX-B change depending on the image height X. A light quantity LQ-A received by the pixel $S_{HA}$ and a light quantity LQ-B received by the pixel $S_{HB}$ also change in accordance with the image height X. From this, as shown in FIG. 21, LQ-A and LQ-B are calculated for each image height in the X direction. A range L2 where both LQ-A and LQ-B fall between a given threshold LQ0 and 1 is set as a focus detection range.

Referring to FIG. 21, the abscissa axis represents the image height in the X direction, and the ordinate axis represents a light quantity LQ received by the pixel. The light quantity LQ shown in FIG. 21 is expressed by a value of 0 to 1 by normalizing maximum values at all image heights. In this fashion, a range where light quantities received by the pixels $S_{HA}$ and $S_{HB}$ are small owing to vignetting of the photographing lens 137 is excluded from the focus detection range. This enables high-precision focus detection without increasing a focus detection error caused by vignetting of the photographing lens 137.

FIG. 22 is a graph showing the relationship between the exit pupil barycenter inclination INCL and the image height in the W direction. Referring to FIG. 22, the abscissa axis W represents an image height in a direction in which the X-axis is rotated by 45° toward the Y-axis, that is, an intermediate direction between the X and Y directions. The ordinate axis represents the exit pupil barycenter inclination INCL. As described with reference to FIGS. 10 to 13, as the image height in the W direction increases, a line connecting the exit pupil barycenter GravityPointA of the pixel $S_{HA}$ and the exit pupil barycenter GravityPointB of the pixel $S_{HA}$ inclines from the pixel arrangement direction owing to vignetting of the photographing lens 137. Hence, as shown in FIG. 22, the exit pupil barycenter inclination INCL is calculated for each image height in the W direction. A range L3 where the exit pupil barycenter inclination INCL does not exceed a given threshold INCL0 is set as a focus detection range. In this manner, a range where the exit pupil barycenter inclination INCL becomes large due to vignetting of the photographing lens 137 is excluded from the focus detection range. This enables high-precision focus detection without increasing a focus detection error caused by vignetting of the photographing lens 137.

Figure 23:
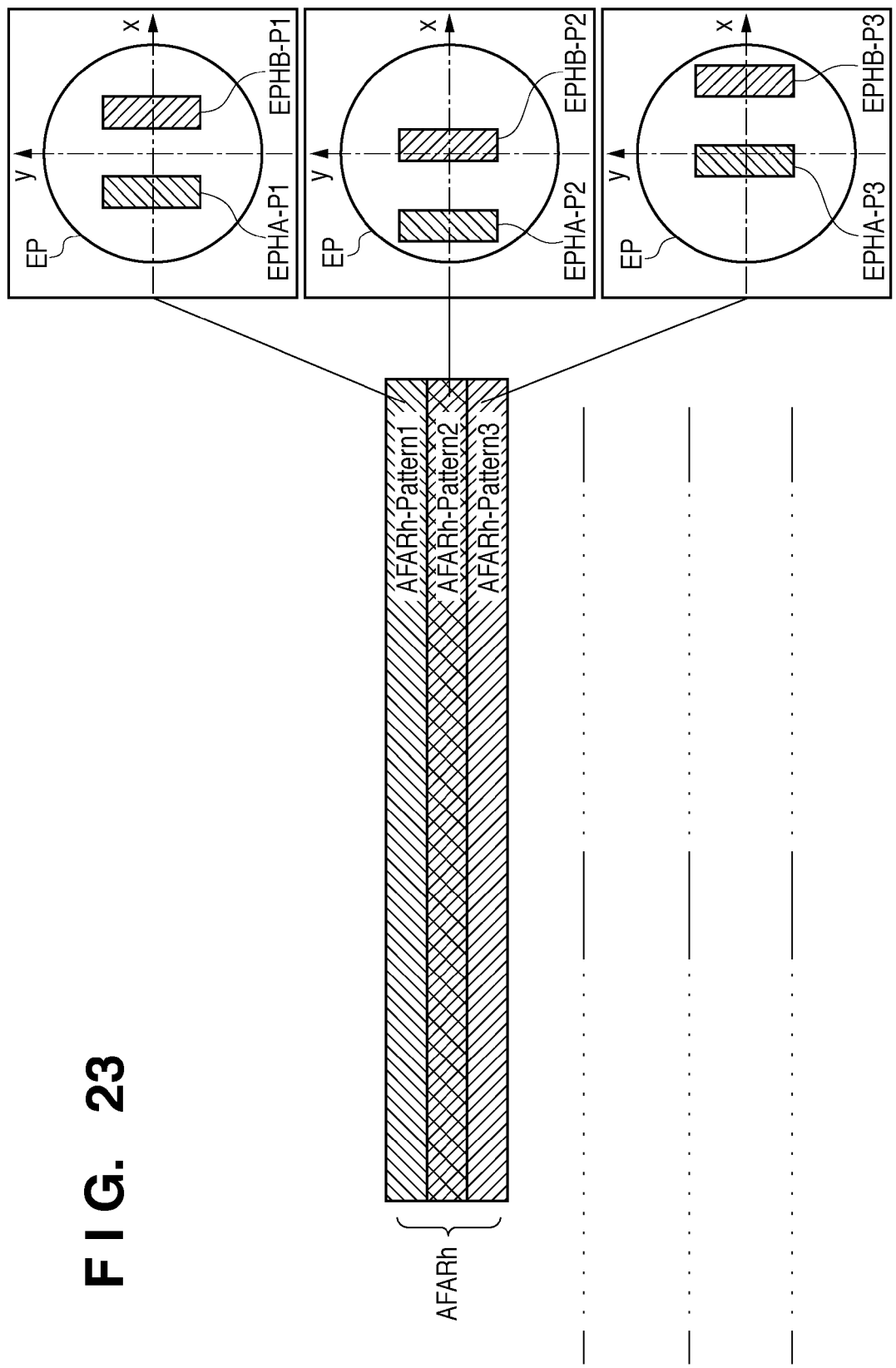
FIG. 23 is a view for explaining a plurality of types of focus detection pixel pairs in the focus detection region.

FIG. 23 is a view for explaining shifts of a plurality of types of paired pixels $S_{HA}$ and $S_{HB}$ in the focus detection region AFARh for lateral shift detection to the pixel arrangement direction while the positional relationship between the exit pupils EPHA and EPHB is kept between different pixel pairs. The focus detection region AFARh for lateral shift detection is divided into three regions in the longitudinal direction. The shift amounts of a pair of exit pupils EPHA and EPHB from the optical axis are different between the different regions. The three divided focus detection regions will be called AFARh-Pattern1, AFARh-Pattern2, and AFARh-Pattern3 from the top.

EPHA-P1 is the exit pupil of the pixel $S_{HA}$ in the focus detection region AFARh-Pattern1. EPHB-P1 is the exit pupil of the pixel $S_{HB}$ in the focus detection region AFARh-Pattern1. EPHA-P2 is the exit pupil of the pixel $S_{HA}$ in the focus detection region AFARh-Pattern2. EPHB-P2 is the exit pupil of the pixel $S_{HB}$ in the focus detection region AFARh-Pattern2. EPHA-P3 is the exit pupil of the pixel $S_{HA}$ in the focus detection region AFARh-Pattern3. EPHB-P3 is the exit pupil of the pixel $S_{HB}$ in the focus detection region AFARh-Pattern3.

A pair of exit pupils EPHA-P1 and EPHB-P1 in the focus detection region AFARh-Pattern1 are set at positions almost symmetrical about the optical axis. The center between the pair of exit pupils EPHA-P1 and EPHB-P1 exists on the optical axis.

In contrast, a pair of exit pupils EPHA-P2 and EPHB-P2 in the focus detection region AFARh-Pattern2 are set at positions shifted to the left while keeping the interval between them. That is, the center between the pair of exit pupils EPHA-P2 and EPHB-P2 shifts from the optical axis to the left.

A pair of exit pupils EPHA-P3 and EPHB-P3 in the focus detection region AFARh-Pattern3 are set at positions shifted to the right while keeping the interval between them. That is, the center between the pair of exit pupils EPHA-P3 and EPHB-P3 shifts from the optical axis to the right.

When vignetting of the photographing lens 137 occurs seriously on a given pair of exit pupils to greatly limit the exit pupil regions, the aforementioned light quantity ratio, light quantities, and exit pupil barycenter inclination exceed their thresholds, failing in focus detection. However, vignetting may not occur seriously on a different pair of exit pupils and focus detection may be possible. Considering this, the image capturing apparatus in the first embodiment sets a plurality of types of exit pupil pairs in the focus detection region AFARh. If at least one of the exit pupil pairs can perform focus detection, this position is set as a focus detectable region. In other words, the focus detection ranges L1, L2, and L3 determined from the light quantity ratio RtAB, light quantities LQ-A and LQ-B, and exit pupil barycenter inclination INCL are calculated for each of the exit pupil pairs. The maximum values are set as the detection ranges L1, L2, and L3 of three types of exit pupil pairs.

The focus detection ranges L1, L2, and L3 become large by setting a plurality of types of exit pupils for a plurality of types of paired pixels $S_{HA}$ and $S_{HB}$ in the focus detection region AFARh. While suppressing a focus detection error, focus detection can be executed in a wide range.

Figure 24:
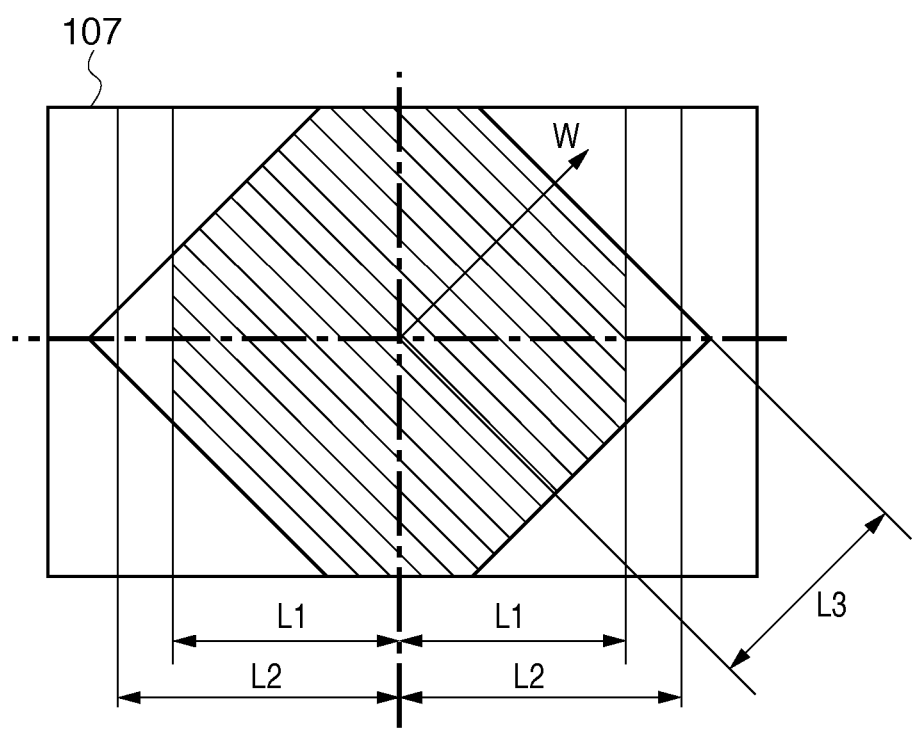
FIG. 24 is a view showing the shape of a focus detection range for lateral shift detection.

FIG. 24 is a view showing the shape of a focus detection range for lateral shift detection that is determined based on the light quantity ratio RtAB, light quantities LQ-A and LQ-B, and exit pupil barycenter inclination INCL. FIG. 24 is a view of the image sensor 107 when viewed from the light incident surface side. FIG. 24 shows the size and shape of a focus detectable range in the entire image sensing region. L1 is the focus detection range L1 determined from the light quantity ratio RtAB of a pair of pixels $S_{HA}$ and $S_{HB}$ described with reference to FIG. 20. L2 is the focus detection range L2 determined from the light quantities LQ-A and LQ-B of a pair of pixels $S_{HA}$ and $S_{HB}$ described with reference to FIG. 21. L3 is the focus detection range L3 determined from the exit pupil barycenter inclination INCL of a pair of pixels $S_{HA}$ and $S_{HB}$ described with reference to FIG. 22. The focus detection range determined from the exit pupil barycenter inclination INCL is approximated in only a direction rotated by 45° from the X-axis to simplify the shape.

The pixels $S_{HA}$ and $S_{HB}$ divide the pupil in the X direction. Thus, the light quantity ratio RtAB greatly changes if the image height changes in the X direction, and hardly changes even if the image height changes in the Y direction. The focus detection range determined by the light quantity ratio RtAB has a rectangular shape which extends from the upper to lower ends in the Y direction and has L1 on one side from the center in the X direction. Similarly, the light quantities LQ-A and LQ-B greatly change if the image height changes in the X direction, and hardly change even if the image height changes in the Y direction. The focus detection range determined by the light quantities LQ-A and LQ-B has a rectangular shape which extends from the upper to lower ends in the Y direction and has L2 on one side from the center in the X direction. As described with reference to FIGS. 10 to 13, the exit pupil barycenter inclination INCL greatly changes when both image heights inclined by 45° from the X and Y directions increase. For this reason, the focus detection range determined by the exit pupil barycenter inclination INCL has a hexagonal shape obtained by extracting a square having a one-side length of 2×L3 upon rotation by 45°.

The focus detection range of the detection region AFARh is defined by a range which satisfies all the conditions of the light quantity ratio RtAB, light quantities LQ-A and LQ-B, and exit pupil barycenter inclination INCL. Thus, the focus detection range for lateral shift detection is formed from an octagonal region (hatched portion) where a rectangle having a width of 2×L1 and an inclined square having a one-side length of 2×L3 overlap each other.

FIGS. 25A to 28 are flowcharts for explaining focus adjustment processing and shooting processing by the image capturing apparatus according to the first embodiment of the present invention.

Figure 25A:
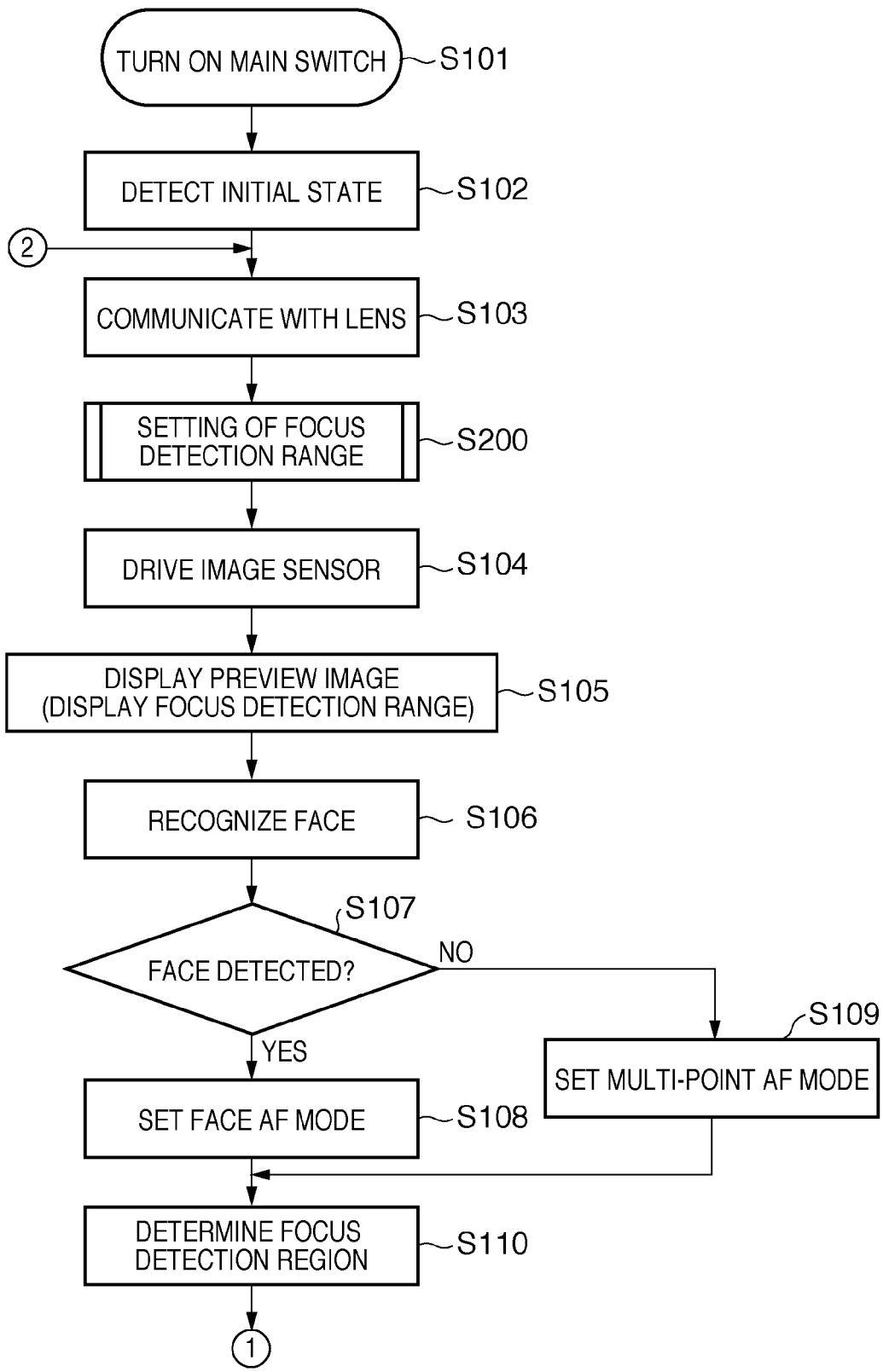
FIGS. 25A and 25B are flowcharts of the main sequence of an image capturing apparatus according to the first embodiment.
Figure 25B:
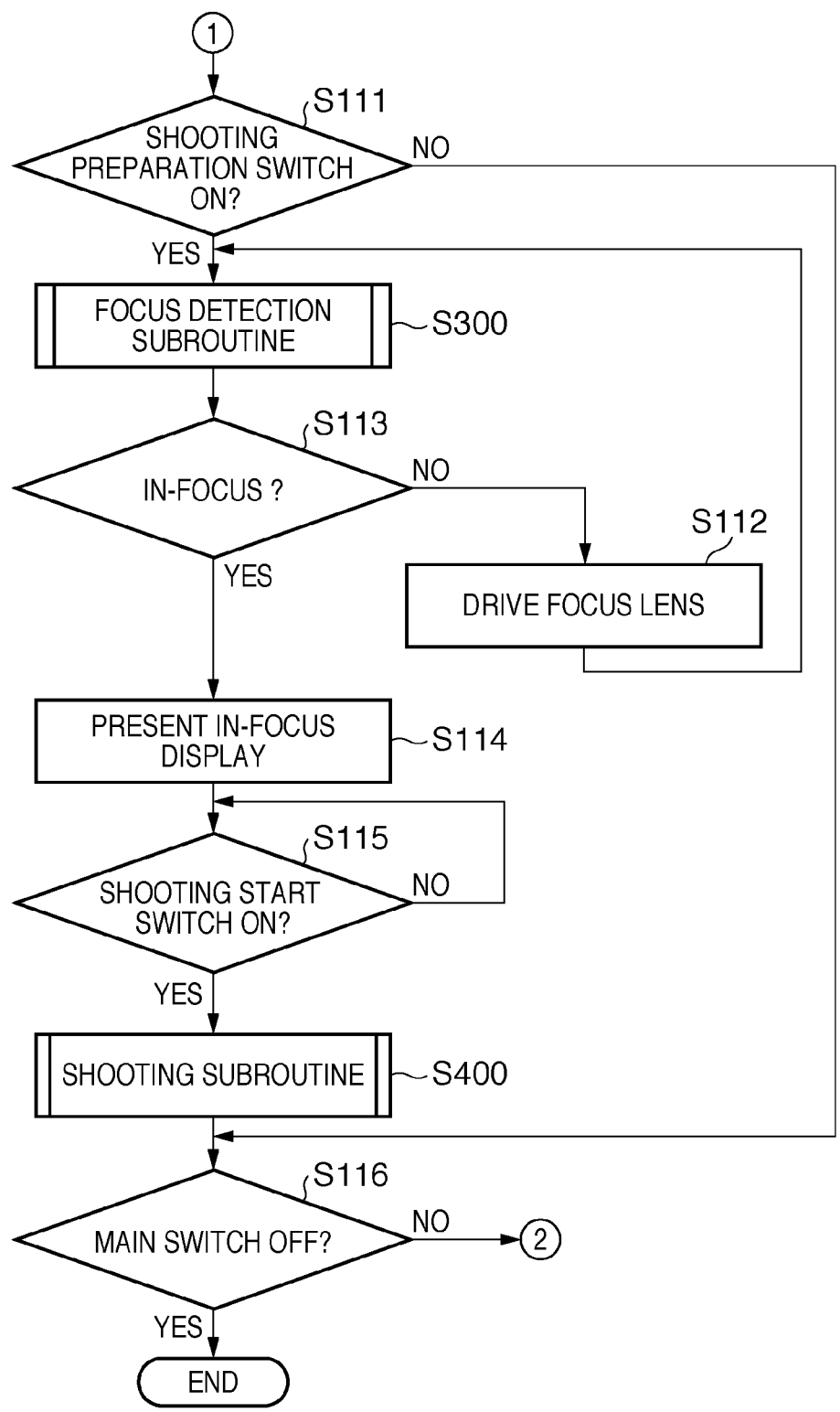

FIGS. 25A and 25B show the main sequence of the image capturing apparatus according to the first embodiment.

The CPU 121 performs the main sequence operation. When the user turns on the power switch of the camera (step S101), the CPU 121 checks the operations of the actuators and image sensor in the camera, initializes memory contents and execution programs, and executes a shooting preparation operation (step S102). In step S103, the CPU 121 communicates with the camera communication circuit 136 in the photographing lens 137 via the lens communication circuit 135. By the communication with the lens, the CPU 121 checks the lens operation, initializes memory contents and execution programs in the lens, and causes the lens to execute a preparation operation. The CPU 121 acquires lens characteristic data necessary for focus detection and image sensing, and saves it in the camera memory 144. In step S200, the CPU 121 sets a focus detection range based on the lens information acquired in step S103 and exit pupil information of a pair of focus detection pixels $S_{HA}$ and $S_{HB}$. In step S104, the CPU 121 starts the image sensing operation of the image sensor, outputting a low-resolution moving image for preview. In step S105, the CPU 121 displays the readout moving image on the display 131 attached to the rear surface of the camera. The user visually checks the preview image and determines the shooting composition. At this time, the focus detection range set in step S200 is also displayed over the low-resolution moving image for preview.

In step S106, the CPU 121 determines whether a face exists in the preview moving image. If the CPU 121 determines that the face exists in the shooting region, the process shifts from step S107 to step S108 to set the focus adjustment mode to the face AF mode. The face AF mode is an AF mode in which the camera is focused on the face in the shooting region.

If no face exists in the shooting region, the process shifts from step S107 to step S109 to set the focus adjustment mode to the multi-point AF mode. The multi-point AF mode is a mode in which the shooting region is divided into, for example, 3×5=15, focus detection is done in the divided regions, a principal object is analogized from the focus detection result and object luminance information, and the camera is focused on the region of the principal object.

After determining the AF mode in step S108 or S109, the CPU 121 determines a focus detection region in step S110. In step S111, the CPU 121 determines whether the user has turned on the shooting preparation switch. If the user has not turned on the shooting preparation switch, the process advances to step S116 to determine whether the user has turned off the main switch.

If the CPU 121 determines in step S111 that the user has turned on the shooting preparation switch, the process shifts to step S300 to execute a focus detection subroutine.

In step S113, the CPU 121 determines whether a defocus amount calculated in step S300 is smaller than an allowance. If the defocus amount is equal to or larger than the allowance, the CPU 121 determines that the camera is out of focus. In step S112, the CPU 121 drives the focus lens, and then repetitively executes steps S300 to S113. If the CPU 121 determines in step S113 that the camera is in focus, it presents an in-focus display in step S114, and shifts to step S115.

In step S115, the CPU 121 determines whether the user has turned on the shooting start switch. If the user has not turned on the shooting start switch, the CPU 121 maintains the shooting standby state in step S115. If the CPU 121 determines in step S115 that the user has turned on the shooting start switch, the process shifts to step S400 to execute a shooting subroutine.

After the end of the shooting subroutine in step S400, the process advances to step S116 to determine whether the user has turned off the main switch. If the user has not turned off the main switch, the process returns to step S103. If the user has turned off the main switch, a series of operations ends.

The image capturing apparatus according to the first embodiment appropriately updates the focus detection range by repetitively setting the focus detection range in step S200. Therefore, a maximum focus detection range in the exit pupil state of a current lens can be set with a small focus detection error.

Figure 26:
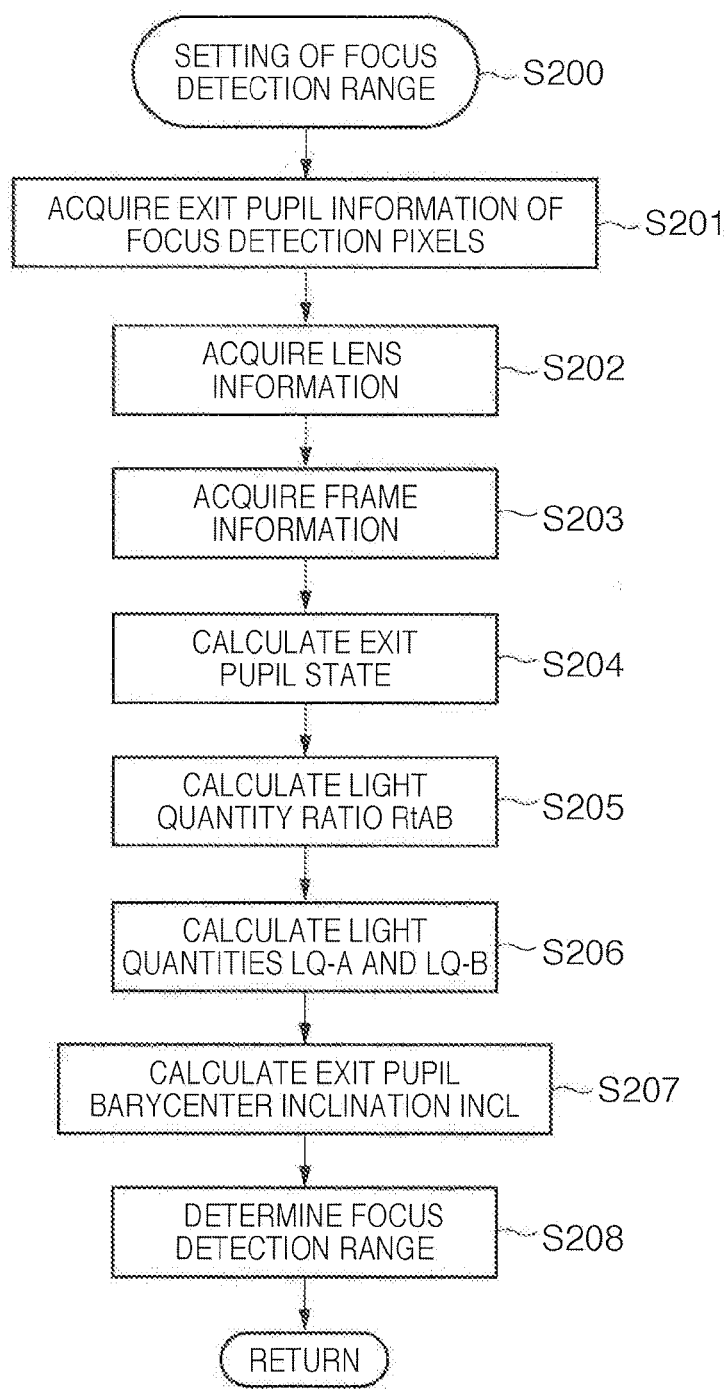
FIG. 26 is a flowchart of a focus detection range setting subroutine.

FIG. 26 is a flowchart of the focus detection range setting (focus detection range determination) subroutine.

The CPU 121 also performs a series of operations of the focus detection range setting subroutine.

When the process jumps from step S200 of the main sequence to step S200 of this subroutine, the CPU 121 acquires exit pupil information of focus detection pixels in step S201. The CPU 121 acquires exit pupil information of the focus detection pixels $S_{HA}$, $S_{HB}$, $S_{VC}$, and $S_{VD}$ that is saved in the camera memory 144. In step S202, the CPU 121 acquires lens information. The CPU 121 communicates with the camera communication circuit in the photographing lens via the lens communication circuit 135 in the camera. Then, the CPU 121 acquires the zoom state (zoom information in the zoom range), stop state, focus state, and lens type information of the lens.

In step S203, the CPU 121 acquires lens frame information of the photographing lens (acquisition of frame information). When a photographing lens having lens frame information is mounted, the CPU 121 communicates with the camera communication circuit 136 in the photographing lens 137 via the lens communication circuit 135 in the camera, acquiring the position and radius of the lens frame. The photographing lens 137 has the lens frame information, and the camera performs arithmetic processing based on the lens frame information in step S203 and subsequent steps. Thus, the CPU 121 need not perform special arithmetic processing for each lens. High-precision focus detection can be achieved without executing special arithmetic processing for each lens and increasing a focus detection error caused by vignetting of the photographing lens.

When a photographing lens having no lens frame information is mounted, the CPU 121 acquires, from the camera memory 144, lens frame information corresponding to the lens type information acquired in step S202. Hence, even for each photographing lens having no lens frame information, high-precision focus detection can be done without executing special arithmetic processing for each lens and increasing a focus detection error caused by vignetting of the photographing lens.

In step S204, the CPU 121 calculates an exit pupil state based on the exit pupil information of focus detection pixels acquired in step S201 and the lens frame information acquired in step S203. Calculation of the exit pupil state is to calculate the exit pupils EPHX-A and EPHX-B formed by vignetting of the photographing lens 137, as described with reference to FIG. 13.

In step S205, based on the exit pupils EPHX-A and EPHX-B calculated in step S204, the CPU 121 calculates the light quantity ratio RtAB which is the ratio of light quantities received by the pixels $S_{HA}$ and $S_{HB}$.

In step S206, based on the exit pupils EPHX-A and EPHX-B calculated in step S204, the CPU 121 calculates a light quantity LQ-A received by the focus detection pixel $S_{HA}$ and a light quantity LQ-B received by the focus detection pixel $S_{HB}$.

In step S207, based on the exit pupils EPHX-A and EPHX-B calculated in step S204, the CPU 121 calculates the inclination (exit pupil barycenter inclination INCL), from the pixel arrangement direction, of a line connecting the exit pupil barycenter GravityPointA of the focus detection pixel $S_{HA}$ and the exit pupil barycenter GravityPointB of the focus detection pixel $S_{HB}$.

In step S208, as described with reference to FIG. 22, the CPU 121 calculates the exit pupil barycenter inclination INCL for each image height in the W direction, and sets, as a focus detection range, the range L3 where the exit pupil barycenter inclination INCL does not exceed the given threshold INCL0. In this way, a range where the exit pupil barycenter inclination INCL becomes large due to vignetting of the photographing lens 137 is excluded from the focus detection range. High-precision focus detection can therefore be achieved without increasing a focus detection error caused by vignetting of the photographing lens 137.

Upon completion of step S208, the focus detection range setting subroutine ends, and the process returns to step S200 in the main sequence.

Figure 27:
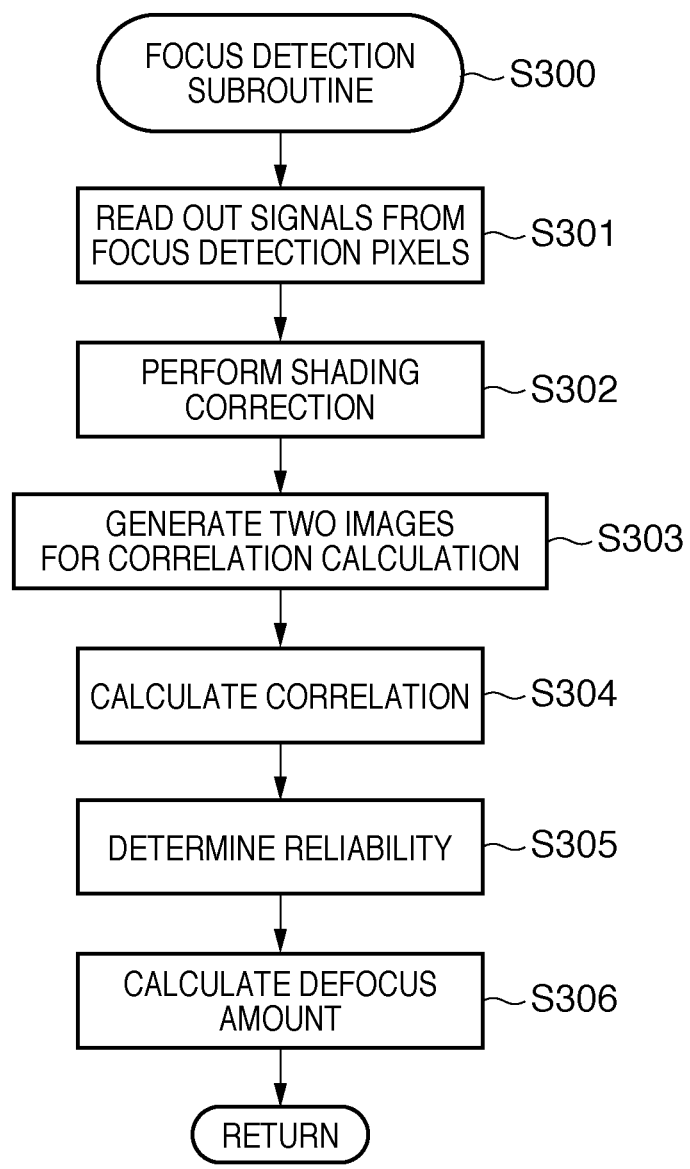
FIG. 27 is a flowchart of a focus detection subroutine.

FIG. 27 is a flowchart of the focus detection subroutine.

The CPU 121 also executes a series of operations of the focus detection subroutine.

When the process jumps from step S300 of the main sequence to step S300 of this subroutine, the CPU 121 reads out, in step S301, signals from focus detection pixels included in the focus detection region determined in step S110 of the main routine. In step S302, the CPU 121 performs so-called shading correction to correct a light quantity ratio for the signals read out from the focus detection pixels in step S301, based on the light quantity ratio RtAB calculated in step S205. In step S303, the CPU 121 arranges the signals having undergone shading correction in step S302, obtaining the signals of image A and image B for correlation calculation. The obtained signals of image A and image B for correlation calculation have undergone shading correction based on the light quantity ratio RtAB, so the signal levels of the pixels $S_{HA}$ and $S_{HB}$ match each other. As a result, the shapes of two obtained images substantially coincide with each other. This can reduce a phase difference detection result error arising from poor coincidence between the signals of image A and image B for correlation calculation.

In step S304, the CPU 121 calculates the correlation based on the obtained images A and B, calculating the phase difference between images A and B. In step S305, the CPU 121 determines the reliability of the correlation calculation result. The reliability is the coincidence between images A and B. The reliability of the correlation calculation result is generally high for high coincidence between images A and B. Depending on whether the coincidence exceeds a given threshold, the reliability of the phase difference detection result is determined. When a plurality of focus detection regions are selected, information with higher reliability is preferentially used. In step S306, the CPU 121 calculates a defocus amount from the detection result with high reliability. After that, the focus detection subroutine ends, and the process returns to step S300 in the main sequence.

Figure 28:
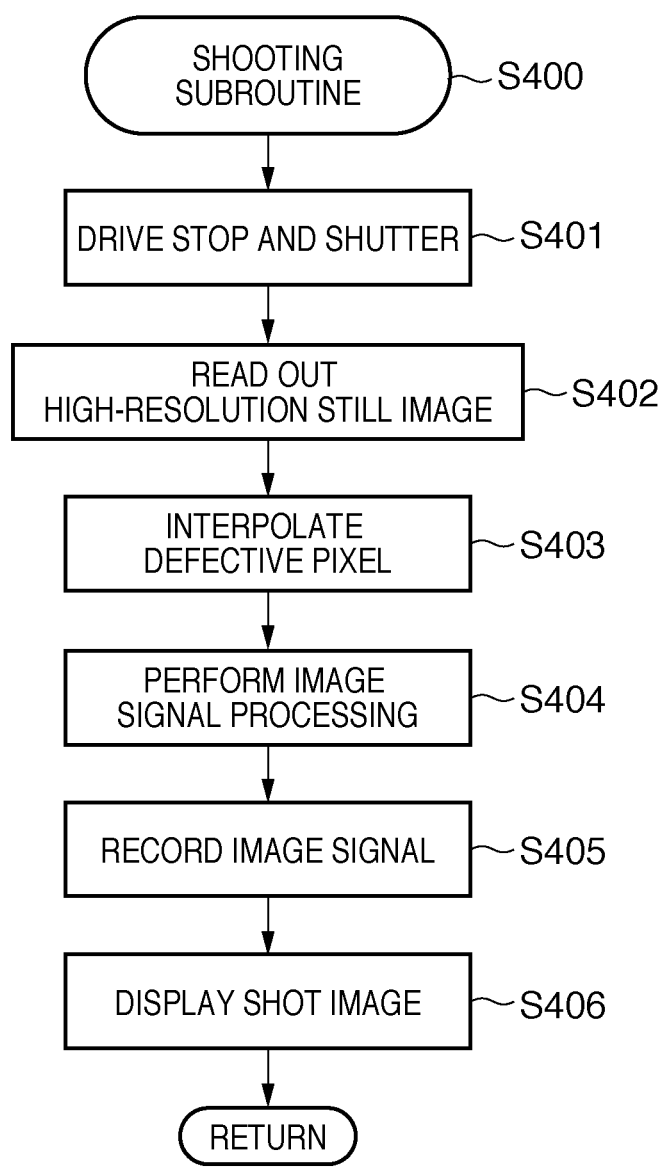
FIG. 28 is a flowchart of a shooting subroutine.

FIG. 28 is a flowchart of the shooting subroutine.

The CPU 121 also executes a series of operations of the shooting subroutine.

In step S401, the CPU 121 drives the light quantity adjustment stop to control the aperture of the mechanical shutter for defining the exposure time. In step S402, the CPU 121 reads out an image for shooting a high-resolution still image, that is, reads out signals from all pixels. In step S403, the CPU 121 interpolates the image signal of a defective pixel using readout image signals. More specifically, an output from a focus detection pixel does not contain RGB color information for image sensing, and the focus detection pixel is defective when obtaining an image. Hence, the image signal is generated by interpolation using information of peripheral image sensing pixels.

The CPU 121 performs image processes such as γ correction and edge emphasis of an image in step S404, and records a shot image in the flash memory 133 in step S405. The CPU 121 displays the shot image on the display 131 in step S406. Thereafter, the process returns to the main sequence.

The image capturing apparatus according to the first embodiment has been described as an interchangeable photographing lens camera, but may be applied to a so-called built-in lens camera in which the camera incorporates the photographing lens. Even the built-in lens camera suffers the conventional problem. Thus, the same effects as those described above can be obtained by setting a focus detection range based on calculation in the embodiment.

As described above, the image capturing apparatus in the first embodiment excludes, from the focus detection range, a range where light quantities received by focus detection pixels greatly differ from each other owing to vignetting of the photographing lens. The image capturing apparatus can perform high-precision focus detection without increasing a focus detection error caused by the eclipse of the photographing lens.

In addition, the image capturing apparatus excludes, from the focus detection range, a range where light quantities received by focus detection pixels are small owing to vignetting of the photographing lens. The image capturing apparatus can achieve high-precision focus detection without increasing a focus detection error caused by the eclipse of the photographing lens.

Further, the image capturing apparatus sets a focus detection range based on the exit pupil barycenter inclination of focus detection pixels. The image capturing apparatus can perform high-precision focus detection without increasing a focus detection error caused by the eclipse of the photographing lens.

Every time the photographing lens state changes, the image capturing apparatus sets again a focus detection range and updates the focus detection range displayed on a preview image. The image capturing apparatus can set a maximum focus detection range coping with the current lens state and present it to the user while suppressing a focus detection error.

Second Embodiment

In the first embodiment, every time the zoom state, stop state, or focus state of the lens changes, the focus detection range is set again to update the focus detection range in the preview image. Although a maximum focus detection range in the exit pupil state of a current lens can be set, the display of the focus detection range changes upon every lens operation. It is difficult for the user to grasp the focus detection range.

To prevent this, in the second embodiment, when a new lens is mounted, a range capable of focus detection in all zoom states, all stop states, and all focus states is set as the focus detection range. That is, a feature of the second embodiment is not to change the focus detection range until the lens is dismounted.

The arrangement of an image capturing apparatus in the second embodiment is the same as that in the first embodiment, and a description thereof will not be repeated.

Figure 29:
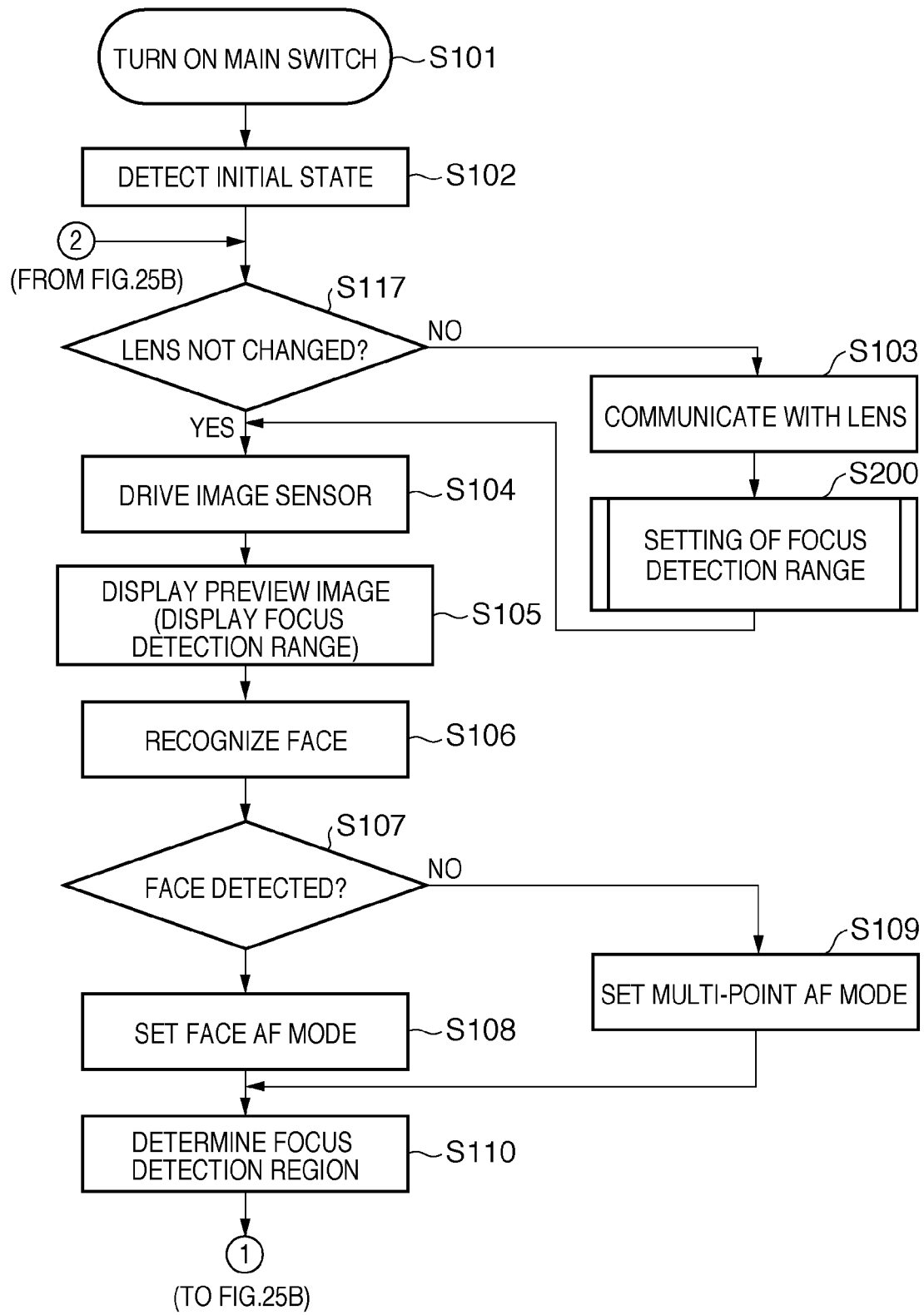
FIG. 29 is a flowchart of the main sequence of an image capturing apparatus according to the second embodiment.

The main sequence operation of the image capturing apparatus according to the second embodiment will be explained with reference to FIG. 29.

A CPU 121 performs the main sequence operation.

When the user turns on the power switch of the camera (step S101), the CPU 121 checks the operations of actuators and an image sensor in the camera, initializes memory contents and execution programs, and executes a shooting preparation operation (step S102). In step S117, the CPU 121 determines whether a new lens has been mounted. If a new lens has been mounted, the process advances to step S103, and the CPU 121 communicates with a camera communication circuit in the photographing lens via a lens communication circuit 135. By the communication with the lens, the CPU 121 checks the lens operation, initializes memory contents and execution programs in the lens, and causes the lens to execute a preparation operation. The CPU 121 acquires lens characteristic data necessary for focus detection and image sensing, and saves it in a camera memory 144. In step S200, the CPU 121 sets a focus detection range based on the lens information acquired in step S103 and exit pupil information of a pair of focus detection pixels $S_{HA}$ and $S_{HB}$.

In step S104, the CPU 121 starts the image sensing operation of the image sensor, outputting a low-resolution moving image for preview. In step S105, the CPU 121 displays the readout moving image on a display 131 attached to the rear surface of the camera. The user visually checks the preview image and determines the shooting composition. At this time, the focus detection range set in step S200 is also displayed over the low-resolution moving image for preview.

In the second embodiment, the focus detection range is set only when a lens is mounted. As the focus detection range, a region is set where the light quantity ratio RtAB, light quantities LQ-A and LQ-B, and exit pupil barycenter inclination INCL satisfy thresholds RtAB0, LQ0, and INCL0 in all zoom states, all stop states, and all focus states of the lens. By setting such a focus detection range, the focus detection range remains unchanged even if the zoom, stop, or focus of the lens changes. The second embodiment can reduce the problem that the focus detection range changes upon every lens operation and it is difficult for the user to grasp the focus detection range.

In step S106, the CPU 121 determines whether a face exists in the preview moving image. If the CPU 121 determines that the face exists in the shooting region, the process shifts from step S107 to step S108 to set the focus adjustment mode to the face AF mode. The face AF mode is an AF mode in which the camera is focused on the face in the shooting region.

If no face exists in the shooting region, the process shifts from step S107 to step S109 to set the focus adjustment mode to the multi-point AF mode. The multi-point AF mode is a mode in which the shooting region is divided into, for example, 3×5=15, focus detection is done in the divided regions, a principal object is analogized from the focus detection result and object luminance information, and the camera is focused on the region of the principal object.

After determining the AF mode in step S108 or S109, the CPU 121 determines a focus detection region in step S110. In step S111, the CPU 121 determines whether the user has turned on the shooting preparation switch. If the user has not turned on the shooting preparation switch, the process advances to step S116.

If the CPU 121 determines in step S111 that the user has turned on the shooting preparation switch, the process shifts to step S300 to execute a focus detection subroutine.

In step S113, the CPU 121 determines whether a defocus amount calculated in step S300 is smaller than an allowance. If the defocus amount is equal to or larger than the allowance, the CPU 121 determines that the camera is out of focus. In step S112, the CPU 121 drives the focus lens, and then repetitively executes steps S300 to S113. If the CPU 121 determines in step S113 that the camera is in focus, it presents an in-focus display in step S114, and shifts to step S115.

In step S115, the CPU 121 determines whether the user has turned on the shooting start switch. If the user has not turned on the shooting start switch, the CPU 121 maintains the shooting standby state in step S115. If the CPU 121 determines in step S115 that the user has turned on the shooting start switch, the process shifts to step S400 to execute a shooting subroutine.

After the end of the shooting subroutine in step S400, the process advances to step S116 to determine whether the user has turned off the main switch. If the user has not turned off the main switch, the process returns to step S117. If the user has turned off the main switch, a series of operations ends.

The focus detection range setting subroutine is the same as that in the first embodiment. The image capturing apparatus in the second embodiment excludes, from the focus detection range, a range where light quantities received by focus detection pixels greatly differ from each other owing to vignetting of the photographing lens. The image capturing apparatus performs high-precision focus detection without increasing a focus detection error caused by the eclipse of the photographing lens.

Also, the image capturing apparatus excludes, from the focus detection range, a range where light quantities received by focus detection pixels are small owing to vignetting of the photographing lens. The image capturing apparatus achieves high-precision focus detection without increasing a focus detection error caused by the eclipse of the photographing lens.

Further, the image capturing apparatus sets a focus detection range based on the exit pupil barycenter inclination of focus detection pixels. The image capturing apparatus performs high-precision focus detection without increasing a focus detection error caused by the eclipse of the photographing lens. The operation sequence of the focus detection range setting subroutine is the same as that in the first embodiment, and a description thereof will not be repeated.

The focus detection subroutine and shooting subroutine are also the same as those in the first embodiment, and a description thereof will not be repeated.

The image capturing apparatus according to the second embodiment has been described as an interchangeable photographing lens camera, but may be applied to a so-called built-in lens camera in which the camera incorporates the photographing lens. Even the built-in lens camera suffers the conventional problem. The same effects as those described above can be attained by setting a focus detection range based on calculation in the embodiment.

As described above, the focus detection device in the second embodiment excludes, from the focus detection range, a range where light quantities received by focus detection pixels greatly differ from each other owing to vignetting of the photographing lens. The focus detection device can perform high-precision focus detection without increasing a focus detection error caused by the eclipse of the photographing lens.

In addition, the focus detection device excludes, from the focus detection range, a range where light quantities received by focus detection pixels are small owing to vignetting of the photographing lens. The focus detection device can achieve high-precision focus detection without increasing a focus detection error caused by the eclipse of the photographing lens.

Further, the focus detection device sets a focus detection range based on the exit pupil barycenter inclination of focus detection pixels. The focus detection device can perform high-precision focus detection without increasing a focus detection error caused by the eclipse of the photographing lens.

The focus detection range is set only when a lens is mounted. This can reduce the problem that the focus detection range changes upon every lens operation and it is difficult for the user to grasp the focus detection range.

Third Embodiment

FIGS. 30 to 35 are views according to the third embodiment of the present invention. In the first and second embodiments, the image sensor includes image sensing pixels and focus detection pixels. The focus detection pixel divides the pupil by projecting, onto the exit pupil of a photographing lens, an aperture shifted from the center of a microlens ML. The focus state of the photographing lens is detected by calculating the phase difference between a pair of image signals obtained from a pair of focus detection pixels having apertures shifted in opposite directions. That is, the first and second embodiments employ a TTL primary imaging type phase-difference focus detection method.

In the third embodiment, light beams guided along split optical paths between a photographing lens and an image sensor form images via a secondary imaging optical system made up of a pair of lens elements. The focus state of the photographing lens is detected based on the phase difference between a pair of obtained image signals. That is, the TTL secondary imaging type phase-difference focus detection method is a feature of the third embodiment.

FIG. 30 is a side sectional view of an image capturing apparatus according to the third embodiment.

In FIG. 30, reference numeral 201 denotes a photographing optical system. A main mirror 202 splits an object light beam traveling from the photographing optical system. Part of the main mirror 202 is a half mirror, and the half mirror transmits part of an object light beam and reflects up the remaining object light beam. A sub-mirror 203 reflects down the object light beam having passed through the main mirror 202. A focus detection device 220 is arranged below the sub-mirror 203 to detect the focus state of the photographing optical system 201. Light reflected by the sub-mirror 203 is guided to the focus detection device 220. An image sensor 204 receives an object light beam formed into an image via the photographing optical system, and converts it into an image signal.

The image sensor 204 is a packaged C-MOS sensor. The focus detection device 220 performs focus detection by the phase difference detection method. The focus state of the photographing optical system 201 is detected from the relative positions of two object images formed by light beams having passed through a pair of different pupil regions of the photographing optical system 201. As disclosed in Japanese Patent Laid-Open No. 52-138924, it is a well-known technique to detect the focus state of a photographing optical system from the relative positions of two object images obtained from a pair of different pupil regions of the photographing optical system.

The main mirror 202 is supported by the camera body via a shaft 202a and can rotate with respect to the camera body. The sub-mirror 203 is also supported by the holding member of the main mirror 202 via a shaft 203a and can rotate with respect to the main mirror 202. The main mirror 202 rotates about the shaft 202a, and the sub-mirror 203 rotates about the shaft 203a. The main mirror 202 and sub-mirror 203 can take two states, that is, a state (called a mirror-down state) in which the main mirror 202 inclines by 45° from the optical axis of the photographing optical system and the sub-mirror 203 inclines down by about 45°, and a state (called a mirror-up state) in which both the main mirror 202 and sub-mirror 203 flip up and completely retract from the optical path of an object light beam.

In the mirror-down state, an object light beam from the photographing optical system 201 is split into two for the upper viewfinder optical system and the lower focus detection device. In the mirror-up state, all object light beams from the photographing optical system 201 are guided to the image sensor 204.

An optical low-pass filter 222 is inserted in an optical path extending from the photographing optical system 201 to the image sensor 204 to limit the cutoff frequency of the photographing optical system 201 so as not to transmit an unnecessarily high spatial frequency component of an object image to the image sensor 204. The optical low-pass filter 222 includes even an infrared cut filter.

A shutter unit 221 is arranged on the light incident surface side of the optical low-pass filter 222 to limit the exposure time of an object light beam incident on the image sensor 204. A front curtain 221a and rear curtain 221b each made up of a plurality of blades travel in the widthwise direction of the image sensor. The shutter speed is controlled by the traveling interval between the front curtain 221a and the rear curtain 221b.

A light shielding member (to be referred to as a cover) 205 limits an object light beam reflected by the sub-mirror 203. The cover 205 has an aperture for transmitting only a light beam necessary for focus detection out of object light beams. The aperture is arranged near almost the imaging plane of the photographing optical system 201. The aperture guides a necessary object light beam to a focus detection optical system (to be described later) and cuts off an unnecessary object light beam.

A field lens 207 projects a stop 213 on the pupil of the photographing optical system. A reflecting mirror 212 is formed by forming an aluminum evaporated film on a glass surface, and reflects light beams having wavelengths of 400 to 800 nm at almost the same reflectance. A reimaging optical system includes the stop 213. The stop 213 has a pair of apertures to limit light beams incident on a pair of lens portions of a reimaging lens 214. The stop 213 is projected on the pupil of the photographing optical system 201 via the field lens 207. Light beams having passed through a pair of different pupil regions on the pupil of the photographing optical system 201 pass through a pair of apertures of the projected stop 213.

The reimaging lens 214 includes a pair of lenses in correspondence with a pair of apertures of the stop 213. The reimaging lens 214 forms images on a focus detection sensor 217 from light beams traveling from different pupil regions of the photographing optical system 201. The focus detection sensor 217 photoelectrically converts object images formed again by the reimaging lens 214. The focus state of a photographing lens 137 is detected based on a pair of image signals obtained by photoelectric conversion by the focus detection sensor 217.

Figure 31:
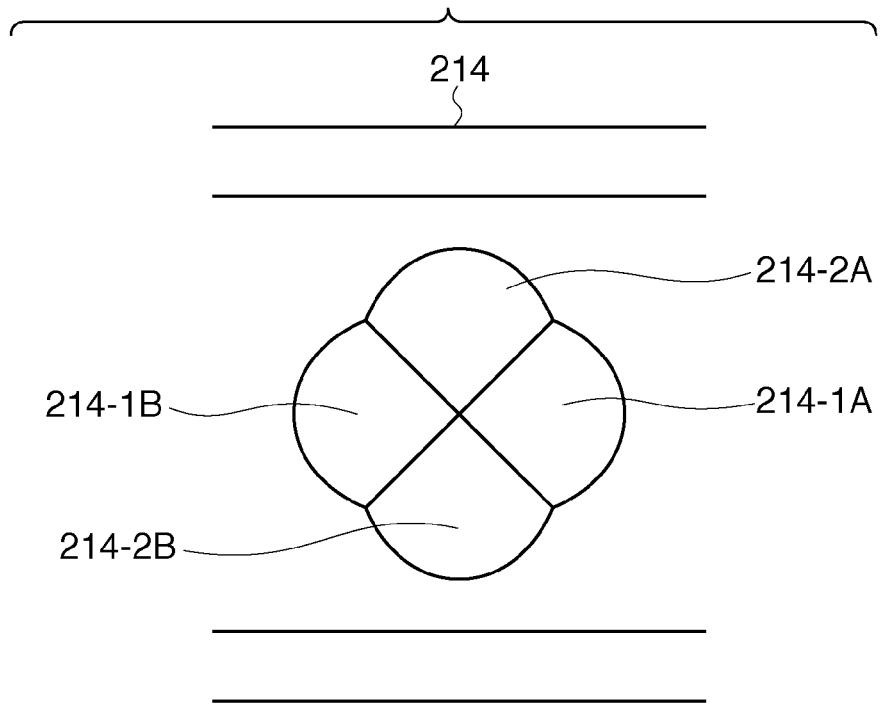
FIG. 31 is an enlarged view showing a reimaging lens cut out from the center on the light exit surface side.

FIG. 31 is an enlarged view showing the reimaging lens 214 cut out from the center on the light exit surface side. Pairs of lens portions are respectively arranged in the longitudinal and lateral directions on the light exit surface side to form a pair of object images again. Each lens portion is spherical and convex on the light exit surface side.

Lens portions 214-1A and 214-1B form images again from focus detection light beams in the lateral distance measurement field of view at the center of the frame. Light beams from the lateral field of view at the center of the frame are formed again into images by the lens portions 214-1A and 214-1B, forming a pair of object images arranged in the lateral direction on the focus detection pixel lines of the focus detection sensor 217.

Lens portions 214-2A and 214-2B form images again from focus detection light beams in the longitudinal field of view at the center of the frame. Light beams from the longitudinal field of view at the center of the frame are formed again into images by the lens portions 214-2A and 214-2B, forming a pair of object images arranged in the longitudinal direction on the focus detection pixel lines of the focus detection sensor 217.

Figure 32:
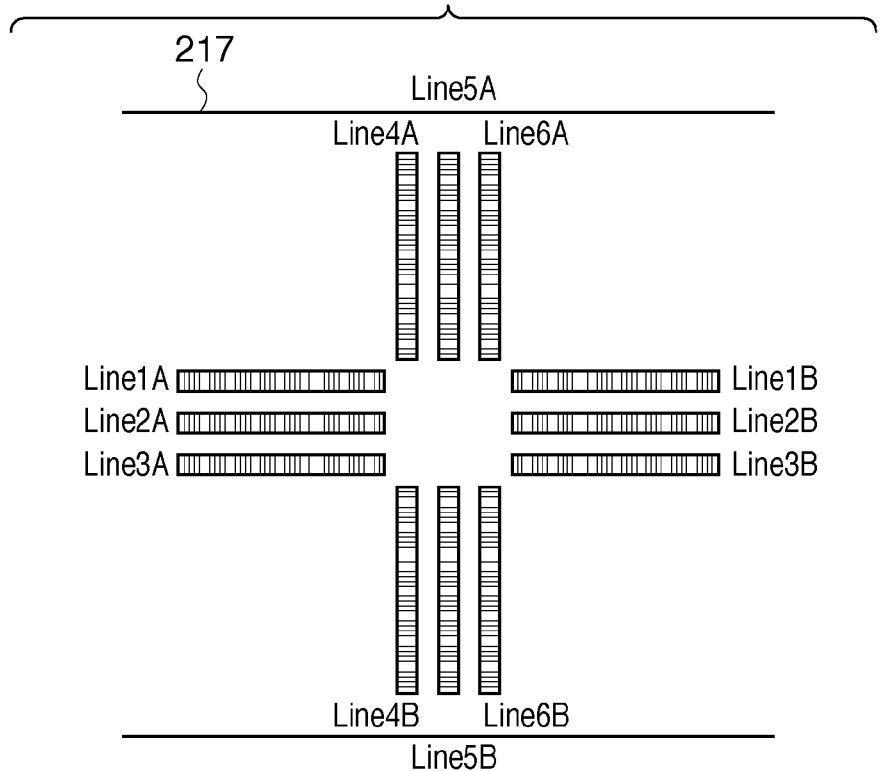
FIG. 32 is an enlarged view showing the chip of a focus detection sensor cut out from the center on the light incident surface side.

FIG. 32 is an enlarged view showing the chip of the focus detection sensor 217 cut out from the center on the light incident surface side. Focus detection pixel lines are arranged in correspondence with the imaging positions of a pair of object images formed again by the reimaging lens 214 as described with reference to FIG. 31.

Light beams from the lateral field of view at the center of the frame are formed again into images on focus detection pixel lines Line1A, Line2A, and Line3A in FIG. 32 by the lens portion 214-1A in FIG. 31, and focus detection pixel lines Line1B, Line2B, and Line3B in FIG. 32 by the lens portion 214-1B in FIG. 31. The focus detection pixel lines Line1A, Line2A, Line3A, Line1B, Line2B, and Line3B are line sensors each configured by aligning a plurality of pixels in the lateral direction.

Similarly, light beams from the longitudinal field of view at the center of the frame are formed again into images on focus detection pixel lines Line4A, Line5A, and Line6A in FIG. 32 by the lens portion 214-2A in FIG. 31, and focus detection pixel lines Line4B, Line5B, and Line6B in FIG. 32 by the lens portion 214-2B in FIG. 31. The focus detection pixel lines Line4A, Line5A, Line6A, Line4B, Line5B, and Line6B are line sensors each configured by aligning a plurality of pixels in the longitudinal direction.

On a pair of focus detection pixel lines in the focus detection sensor 217, a plurality of pixels are aligned. A relative lateral shift is observed between the output signal waveforms of a pair of pixel lines in accordance with the imaging state of an object image formed in the focus detection field of view by the photographing optical system 201. The shift direction between the output signal waveforms is opposite between near- and far-focus states. The principle of focus detection is to detect the phase difference including the direction by a method such as correlation calculation.

Figure 33:
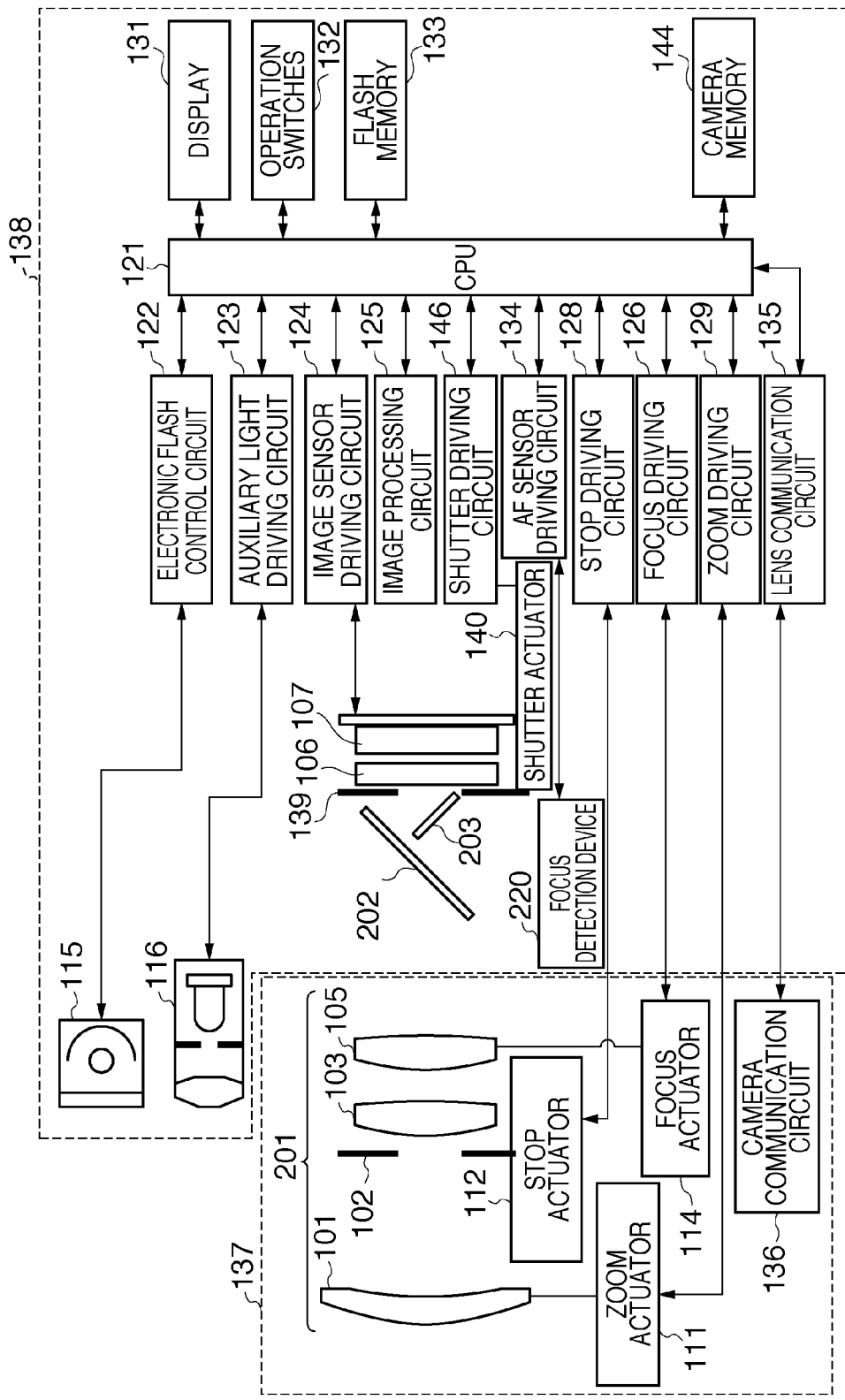
FIG. 33 is a block diagram showing the arrangement of the image capturing apparatus including the focus detection device according to the third embodiment.

FIG. 33 is a block diagram of the arrangement of the image capturing apparatus including the focus detection device according to the third embodiment. In FIG. 33, the image capturing apparatus is a digital camera which includes a camera body 138 having an image sensor and a separate photographing lens 137 and interchangeably mounts the photographing lens 137 on the camera body 138. The third embodiment is different from the first embodiment in the focus detection device 220 and an AF sensor driving circuit 134 for driving it. The remaining arrangement is the same as that in the first embodiment, and a description thereof will not be repeated.

Referring to FIG. 33, the focus detection device 220 is arranged below the sub-mirror 203 to detect the focus state of the photographing optical system 201. Light reflected by the sub-mirror 203 is guided to the focus detection device 220. As described with reference to FIG. 30, the focus detection device 220 includes the focus detection sensor 217 which photoelectrically converts optical images formed again by the reimaging lens 214 from light beams reflected by the sub-mirror 203, thereby generating a pair of image signals. A CPU 121 has a function of driving the focus detection sensor 217. The CPU 121 acquires a pair of image signals from the focus detection device 220 and calculates the phase difference, detecting the focus state of the photographing lens 137.

Focus detection pixels in the third embodiment also divide the pupil as shown in FIG. 8, similar to the first embodiment.

The stop 213 functions as the exit pupil of the reimaging lens 214 for forming an image signal on a focus detection pixel. The field lens 207 projects the stop 213 on the exit pupil of the photographing optical system 201. That is, the stop 213 and the exit pupil of the photographing optical system 201 are optically conjugate to each other. The exit pupils of the lens portions 214-1A, 214-1B, 214-2A, and 214-2B of the reimaging lens 214 are projected via the field lens 207 and serve as pupils EPHA, EPHB, EPVC, and EPVD. As a result, the pupil is divided.

The exit pupil of a focus detection pixel in the third embodiment is also limited by vignetting of the photographing lens 137, as described with reference to FIGS. 10 to 13 in the first embodiment. The exit pupils of focus detection pixels are limited into EPHX-A and EPHX-B in FIG. 13.

The exit pupils EPHX-A and EPHX-B are different in area, so the light quantity ratio RtAB of a pair of focus detection pixels changes depending on the image height X. As described with reference to FIG. 20 in the first embodiment, the focus detection range is limited to the range L1 where the light quantity ratio RtAB equals the threshold Rt0. This enables high-precision focus detection without increasing a focus detection error caused by vignetting of the photographing lens.

The light quantities LQ-A and LQ-B received by a pair of focus detection pixels also change depending on the image height X. As described with reference to FIG. 21 in the first embodiment, the focus detection range is limited to the range L2 where the light quantities LQ-A and LQ-B received by focus detection pixels become equal to or smaller than the threshold LQ0. This enables high-precision focus detection without increasing a focus detection error caused by vignetting of the photographing lens.

Further, a line connecting the exit pupil barycenters GravityPointA and GravityPointB inclines from the pixel arrangement direction. The exit pupil barycenter inclination INCL also changes depending on the image height in the W direction. The focus detection range is limited to the range L3 where the exit pupil barycenter inclination INCL equals the threshold INCL0. This enables high-precision focus detection without increasing a focus detection error caused by vignetting of the photographing lens.

FIG. 34 shows the shape of a focus detection range for lateral shift detection in the focus detection device according to the third embodiment. FIG. 34 is a plan view of the image sensor 107 when viewed from the light incident surface side. FIG. 34 shows the size and shape of a focus detectable range in the entire image sensing region.

Line1 is a region where the focus detection pixel lines Line1A and Line1B in FIG. 32 receive light. Line2 is a region where the focus detection pixel lines Line2A and Line2B in FIG. 32 receive light. Line3 is a region where the focus detection pixel lines Line3A and Line3B in FIG. 32 receive light. Line4 is a region where the focus detection pixel lines Line4A and Line4B in FIG. 32 receive light. Line5 is a region where the focus detection pixel lines Line5A and Line5B in FIG. 32 receive light. Line6 is a region where the focus detection pixel lines Line6A and Line6B in FIG. 32 receive light.

Similar to the first embodiment, the focus detection range is determined based on the light quantity ratio RtAB, light quantities LQ-A and LQ-B, and exit pupil barycenter inclination INCL. L1 is the focus detection range L1 determined from the light quantity ratio RtAB of a pair of pixels $S_{HA}$ and $S_{HB}$ described with reference to FIG. 20. L2 is the focus detection range L2 determined from the light quantities LQ-A and LQ-B of a pair of pixels $S_{HA}$ and $S_{HB}$ described with reference to FIG. 21. L3 is the focus detection range L3 determined from the exit pupil barycenter inclination INCL of a pair of pixels $S_{HA}$ and $S_{HB}$ described with reference to FIG. 22. The focus detection range determined from the exit pupil barycenter inclination INCL is approximated in only a direction rotated by 45° from the X-axis to simplify the shape.

The focus detection range is defined by a range which satisfies all the conditions of the light quantity ratio RtAB, light quantities LQ-A and LQ-B, and exit pupil barycenter inclination INCL. Thus, the focus detection range is formed from Line1 to Line6 (hatched portions) where a rectangle having a width of 2×L1 and a 45°-inclined square having a one-side length of 2×L3 overlap each other.

Figure 35:
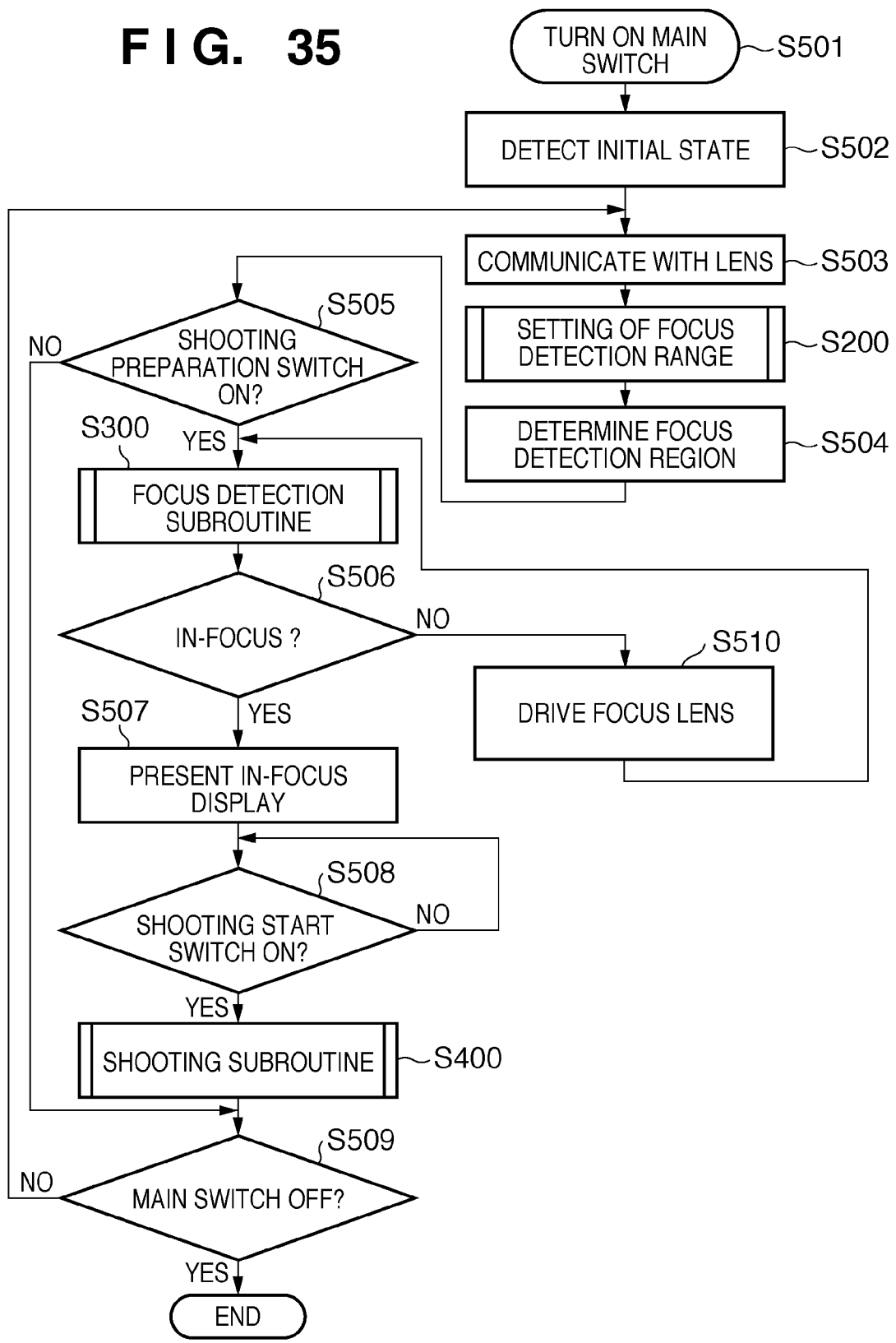
FIG. 35 is a flowchart of the main sequence of the image capturing apparatus according to the third embodiment.

FIG. 35 shows the main sequence of the image capturing apparatus according to the third embodiment of the present invention.

When the user turns on the power switch of the camera (step S501), the CPU 121 checks the operations of actuators and an image sensor in the camera, initializes memory contents and execution programs, and executes a shooting preparation operation in step S502. In step S503, the CPU 121 communicates with a camera communication circuit in the photographing lens via a lens communication circuit 135. By the communication with the lens, the CPU 121 checks the lens operation, initializes memory contents and execution programs in the lens, and causes the lens to execute a preparation operation. The CPU 121 acquires lens characteristic data necessary for focus detection and image sensing, and saves it in a camera memory 144. In step S200, the CPU 121 sets a focus detection range based on the lens information acquired in step S503 and exit pupil information of focus detection pixels. In step S504, the CPU 121 determines a focus detection region based on a position designated with a focus detection region designating member set among operation switches 132. In step S505, the CPU 121 determines whether the user has turned on the shooting preparation switch. If the user has not turned on the shooting preparation switch, the process advances to step S509.

If the CPU 121 determines in step S505 that the user has turned on the shooting preparation switch, the process shifts to step S300 to execute a focus detection subroutine.

In step S506, the CPU 121 determines whether a defocus amount calculated in step S300 is smaller than an allowance. If the defocus amount is equal to or larger than the allowance, the CPU 121 determines that the camera is out of focus. In step S510, the CPU 121 drives the focus lens, and then repetitively executes steps S300 to S506. If the CPU 121 determines in step S506 that the camera is in focus, it presents an in-focus display in step S507, and shifts to step S508.

In step S508, the CPU 121 determines whether the user has turned on the shooting start switch. If the user has not turned on the shooting start switch, the CPU 121 maintains the shooting standby state in step S508. If the CPU 121 determines in step S508 that the user has turned on the shooting start switch, the process shifts to step S400 to execute a shooting subroutine. After the end of the shooting subroutine in step S400, the process advances to step S509 to determine whether the user has turned off the main switch. If the user has not turned off the main switch, the process returns to step S503. If the user has turned off the main switch, a series of operations ends.

The focus detection range setting subroutine in step S200, the focus detection subroutine in step S300, and the shooting subroutine in step S400 are the same as those in the first embodiment, and a description thereof will not be repeated.

The image capturing apparatus according to the third embodiment has been described as an interchangeable photographing lens camera, but may be applied to a so-called built-in lens camera in which the camera incorporates the photographing lens. Even the built-in lens camera suffers the conventional problem. Hence, the same effects as those described above can be obtained by setting a focus detection range based on calculation in the embodiment.

As described above, even in the TTL secondary imaging type phase-difference focus detection method, the image capturing apparatus in the third embodiment excludes, from the focus detection range, a range where light quantities received by focus detection pixels greatly differ from each other owing to vignetting of the photographing lens. The image capturing apparatus can perform high-precision focus detection without increasing a focus detection error caused by the eclipse of the photographing lens.

The image capturing apparatus excludes, from the focus detection range, a range where light quantities received by focus detection pixels are small owing to vignetting of the photographing lens. The image capturing apparatus can achieve high-precision focus detection without increasing a focus detection error caused by the eclipse of the photographing lens.

Further, the image capturing apparatus sets a focus detection range based on the exit pupil barycenter inclination of focus detection pixels. The image capturing apparatus can perform high-precision focus detection without increasing a focus detection error caused by the eclipse of the photographing lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-280274, filed Oct. 30, 2008 which is hereby incorporated by reference herein in its entirety.

The invention claimed is:

1. An image capturing apparatus comprising:
photoelectric conversion means including a first pixel group which includes first pixels and a second pixel group which includes second pixels, wherein the first pixels photoelectrically convert an object image formed via a first exit pupil region of a photographing lens and the second pixels photoelectrically convert an object image formed via a second exit pupil region different from the first exit pupil region;
focus detection means for detecting a focus of the photographing lens using a first image signal obtained from the first pixel group and a second image signal obtained from the second pixel group;
calculation means for calculating an inclination of a straight line connecting a barycenter of the first exit pupil region and a barycenter of the second exit pupil region from a pixel arrangement direction of the first pixel group and second pixel group; and
focus detection range setting means for setting a focus detection range based on a calculation result of said calculation means.

2. The apparatus according to claim 1, wherein said photoelectric conversion means includes a third pixel group for acquiring an image sensing signal, and the first pixel group and the second pixel group are discretely arranged in the third pixel group.

3. The apparatus according to claim 1, further comprising:
information acquisition means for acquiring zoom information and stop information from the photographing lens;
storage means for storing lens frame information corresponding to the zoom information and the stop information; and
frame information acquisition means for acquiring, from said storage means, the lens frame information corresponding to the zoom information and the stop information,
wherein said calculation means calculates the barycenter of the first exit pupil region and the barycenter of the second exit pupil region based on the lens frame information, and calculates the inclination of the straight line connecting the barycenter of the first exit pupil region and the barycenter of the second exit pupil region from the pixel arrangement direction of the first pixel group and second pixel group.

4. The apparatus according to claim 1, further comprising frame information acquisition means for acquiring lens frame information from the photographing lens,
wherein said calculation means calculates the barycenter of the first exit pupil region and the barycenter of the second exit pupil region based on the lens frame information, and calculates the inclination of the straight line connecting the barycenter of the first exit pupil region and the barycenter of the second exit pupil region from the pixel arrangement direction of the first pixel group and second pixel group.

5. The apparatus according to claim 1, further comprising display means for displaying an image obtained by said photoelectric conversion means,
wherein every time either of a zoom state and stop state of the photographing lens is changed, a focus detection range displayed over the image is updated.

6. The apparatus according to claim 1, further comprising display means for displaying an image obtained by said photoelectric conversion means,
wherein a range capable of focus detection in an entire zoom region of the photographing lens and an entire region of aperture values is a focus detection range displayed over the image.

7. An image capturing apparatus comprising:
a photoelectric conversion unit including a first pixel group which includes first pixels and a second pixel group which includes second pixels, wherein the first pixels photoelectrically convert an object image formed via a first exit pupil region of a photographing lens and the second pixels photoelectrically convert an object image formed via a second exit pupil region different from the first exit pupil region;
a focus detection unit for detecting a focus of the photographing lens using a first image signal obtained from the first pixel group and a second image signal obtained from the second pixel group;
a calculation unit for calculating an inclination of a straight line connecting a barycenter of the first exit pupil region and a barycenter of the second exit pupil region from a pixel arrangement direction of the first pixel group and second pixel group; and
a focus detection range setting unit for setting a focus detection range based on a calculation result of said calculation unit.

8. The apparatus according to claim 7, wherein said photoelectric conversion unit includes a third pixel group for acquiring an image sensing signal, and the first pixel group and the second pixel group are discretely arranged in the third pixel group.

9. The apparatus according to claim 7, further comprising:
an information acquisition unit for acquiring zoom information and stop information from the photographing lens;
a storage unit for storing lens frame information corresponding to the zoom information and the stop information; and
a frame information acquisition unit for acquiring, from said storage unit, the lens frame information corresponding to the zoom information and the stop information,
wherein said calculation unit calculates the barycenter of the first exit pupil region and the barycenter of the second exit pupil region based on the lens frame information, and calculates the inclination of the straight line connecting the barycenter of the first exit pupil region and the barycenter of the second exit pupil region from the pixel arrangement direction of the first pixel group and second pixel group.

10. The apparatus according to claim 7, further comprising a frame information acquisition unit for acquiring lens frame information from the photographing lens,
wherein said calculation unit calculates the barycenter of the first exit pupil region and the barycenter of the second exit pupil region based on the lens frame information, and calculates the inclination of the straight line connecting the barycenter of the first exit pupil region and the barycenter of the second exit pupil region from the pixel arrangement direction of the first pixel group and second pixel group.

11. The apparatus according to claim 7, further comprising a display unit for displaying an image obtained by said photoelectric conversion unit,
wherein every time either of a zoom state and stop state of the photographing lens is changed, a focus detection range displayed over the image is updated.

12. The apparatus according to claim 7, further comprising a display unit for displaying an image obtained by said photoelectric conversion unit,
wherein a range capable of focus detection in an entire zoom region of the photographing lens and an entire region of aperture values is a focus detection range displayed over the image.

* * * * *